United States Patent
Thiers

(10) Patent No.: US 8,746,721 B2
(45) Date of Patent: Jun. 10, 2014

(54) MOTORCYCLE STEERING WITH FOUR-BAR LINKAGE

(76) Inventor: Jean-Michel Thiers, Sunnyvale, CA (US)

(*) Notice: Subject to any disclaimer, the term of this patent is extended or adjusted under 35 U.S.C. 154(b) by 0 days.

(21) Appl. No.: 13/558,341

(22) Filed: Jul. 26, 2012

(65) Prior Publication Data

US 2014/0027998 A1 Jan. 30, 2014

(51) Int. Cl.
B62K 21/00 (2006.01)

(52) U.S. Cl.
USPC ............. 280/276; 280/270; 280/277; 280/92; 180/219; 180/6.24; 180/6.32

(58) Field of Classification Search
USPC ........... 280/276, 270, 277, 92; 180/219, 6.24, 180/6.32
See application file for complete search history.

(56) References Cited

U.S. PATENT DOCUMENTS

| | | |
|---|---|---|
| 364,335 A | 6/1887 | Burdess |
| 388,043 A | 8/1888 | House |
| 431,061 A | 7/1890 | Kenney |
| 477,583 A | 6/1892 | Van Bibber |
| 501,501 A | 7/1893 | Gehricke |
| 538,482 A | 4/1895 | Doan et al. |
| 1,175,744 A | 3/1916 | Giles |
| 1,262,625 A | 4/1918 | Berlin et al. |
| 1,623,726 A | 4/1927 | Herds |
| 2,038,843 A | 4/1936 | Jones |
| 2,199,966 A | 5/1940 | Timm |
| 2,339,582 A | 1/1944 | Peterson |
| 2,510,798 A | 6/1950 | Cahill |
| 2,580,064 A | 12/1951 | Albright |
| 3,110,352 A | 11/1963 | McClarnon |
| 3,521,904 A | 7/1970 | Sheffer |
| 3,539,196 A | 11/1970 | Fleming |
| 4,212,481 A | 7/1980 | Ribi |
| 4,265,329 A | 5/1981 | de Cortanze |
| 4,353,567 A | 10/1982 | Weldy |
| 4,401,316 A | 8/1983 | Miyakoshi |
| 4,500,056 A | 2/1985 | Della-Moretta |
| 4,526,249 A | 7/1985 | Parker |
| 4,662,469 A | 5/1987 | Matsuda et al. |
| 4,685,694 A | 8/1987 | Kouyama |
| 4,702,338 A | 10/1987 | Trema |
| 4,741,545 A | 5/1988 | Honma et al. |
| 4,773,499 A | 9/1988 | Frye |
| 4,890,857 A | 1/1990 | de Cortanze |
| 5,133,223 A | 7/1992 | Morri |

(Continued)

OTHER PUBLICATIONS

Tony Foale, "Motorcycle Handling and Chassis Design, the Art and Science." p. 7-31 to 7-33.

(Continued)

Primary Examiner — Kevin Hurley
Assistant Examiner — Michael Stabley

(57) ABSTRACT

A steering mechanism may include a four-bar linkage having a ground link, a coupler link, and a pair of follower links. The ground link may be connected to a vehicle having a wheel defining a wheel centerline. The coupler link may be connected to the wheel and may be located aft of the ground link. The pair of follower links may pivotally connect the ground link to the coupler link. The follower links may extend aftwardly from the ground link at converging angles and may define a steering axis located aft of the wheel centerline.

19 Claims, 14 Drawing Sheets

(56) References Cited

U.S. PATENT DOCUMENTS

| | | |
|---|---|---|
| 5,361,864 A | 11/1994 | Tanaka |
| 5,462,302 A | 10/1995 | Leitner |
| 5,782,313 A | 7/1998 | Kurawaki et al. |
| 5,820,439 A | 10/1998 | Hair, III |
| 6,095,891 A | 8/2000 | Hoeting et al. |
| 6,120,048 A | 9/2000 | Li |
| 6,308,640 B1 | 10/2001 | Weule |
| 6,325,396 B1 | 12/2001 | Romig |
| 6,786,796 B2 | 9/2004 | Suto |
| 6,976,691 B1 | 12/2005 | Song et al. |
| 6,994,365 B2 * | 2/2006 | Kofuji ............ 280/277 |
| 7,018,126 B2 | 3/2006 | Henricksen |
| 7,887,077 B2 | 2/2011 | Thiers |
| 2006/0009119 A1 | 1/2006 | Hoeting et al. |
| 2006/0037797 A1 | 2/2006 | Mathon |
| 2006/0037799 A1 | 2/2006 | Mathon |

OTHER PUBLICATIONS

Tier Motorsports, "Tier Motorsports Brochure," available at <http://www.tiermotor.com/Four-Bar%20Steering%20Mechanism.pdf>, last visited Jul. 24, 2012.

Tier Motorsports, "Front Swing Arm Kits for Off-Road Bikes," available at <http://www.tiermotor.com/offroad09.pdf>, last visited Jul. 24, 2012.

* cited by examiner

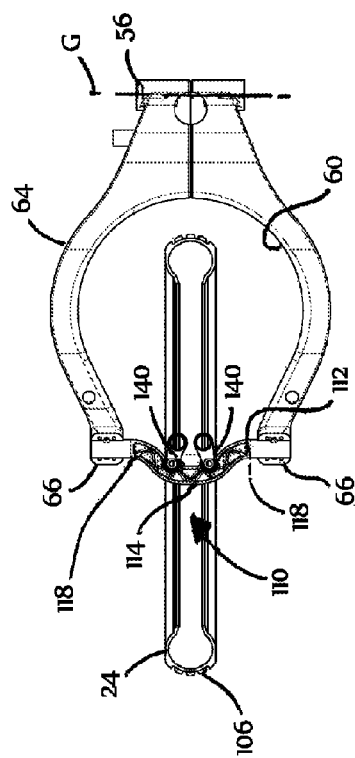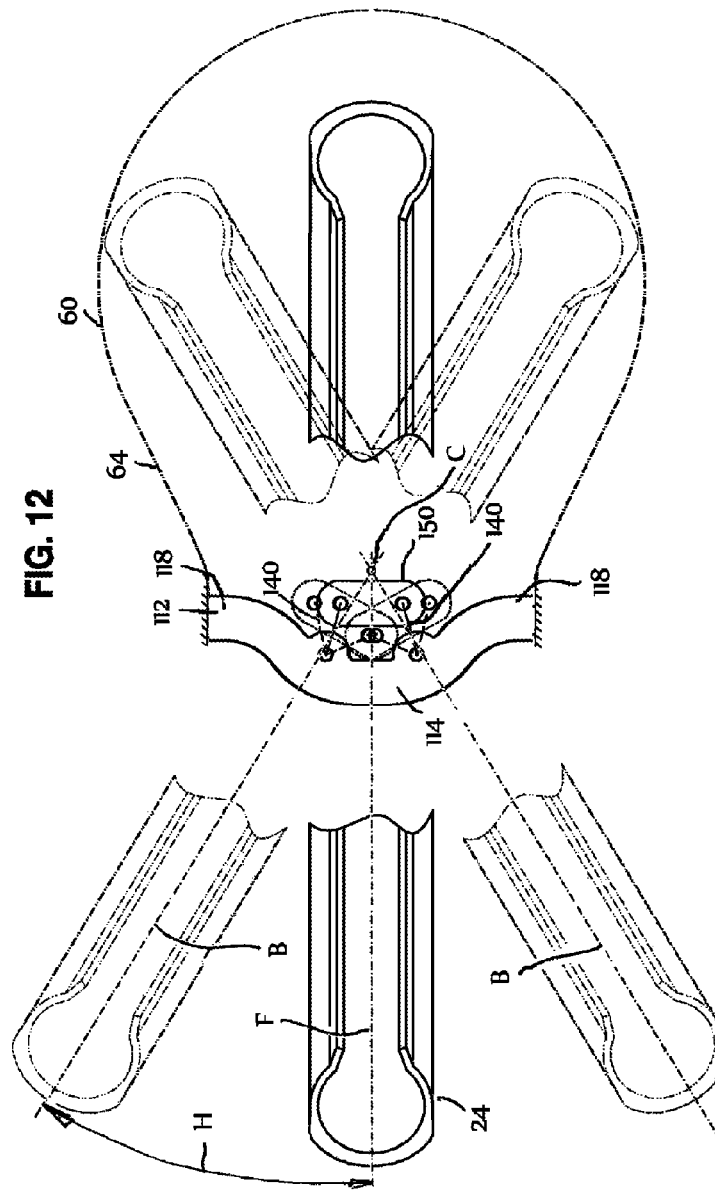

CONVENTIONAL TELESCOPIC FRONT FORKS - WHEEL-CENTERING FORCE (NEWTONS)

| | 0.5° | 1° | 2° | 3° | 4° | 5° | 10° | 15° |
|---|---|---|---|---|---|---|---|---|
| AT WHEEL | | | | | | | 129 | |
| AT HANDLEBAR GRIP WITH NO FORK TRAVEL | 7 | 14 | 26 | 41 | 55 | 67 | 135 | 209 |
| AT HANDLEBAR GRIP WITH FULL FORK TRAVEL | | | 27 | | | 72 | 146 | 225 |

FIG. 14A

ORIGINAL 4-BAR LINKAGE - WHEEL-CENTERING FORCE (NEWTONS)

| | 0.5° | 1° | 2° | 3° | 4° | 5° | 10° | 15° |
|---|---|---|---|---|---|---|---|---|
| AT WHEEL | | | | | | | 245 | |
| AT HANDLEBAR GRIP WITH NO WHEEL DISPLACEMENT | 16 | 32 | 62 | 92 | 120 | 147 | 246 | 290 |
| AT HANDLEBAR GRIP WITH VERTICAL WHEEL DISPLACEMENT EQUIVALENT TO FULL FORK TRAVEL | 16 | | | | | | | |
| DIFFERENCE WITH FRONT FORKS | 9 | 18 | 35 | 51 | 65 | 80 | 110 | 81 |

FIG. 15A

REVERSE 4-BAR LINKAGE - WHEEL-CENTERING FORCE (NEWTONS)

| | 0.5° | 1° | 2° | 3° | 4° | 5° | 10° | 15° |
|---|---|---|---|---|---|---|---|---|
| AT WHEEL | 10 | 21 | 40 | 59 | 76 | 91 | 141 | 145 |
| AT HANDLEBAR GRIP WITH NO WHEEL DISPLACEMENT | 9 | 19 | 36 | 53 | 68 | 80 | 125 | 128 |
| AT HANDLEBAR GRIP WITH VERTICAL WHEEL DISPLACEMENT EQUIVALENT TO FULL FORK TRAVEL | 9 | 18 | | 52 | 67 | | | |
| DIFFERENCE WITH FRONT FORKS | 2 | 5 | 9 | 12 | 13 | 13 | -11 | -81 |

FIG. 16A

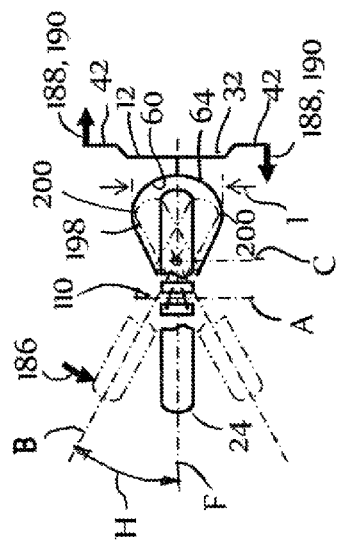
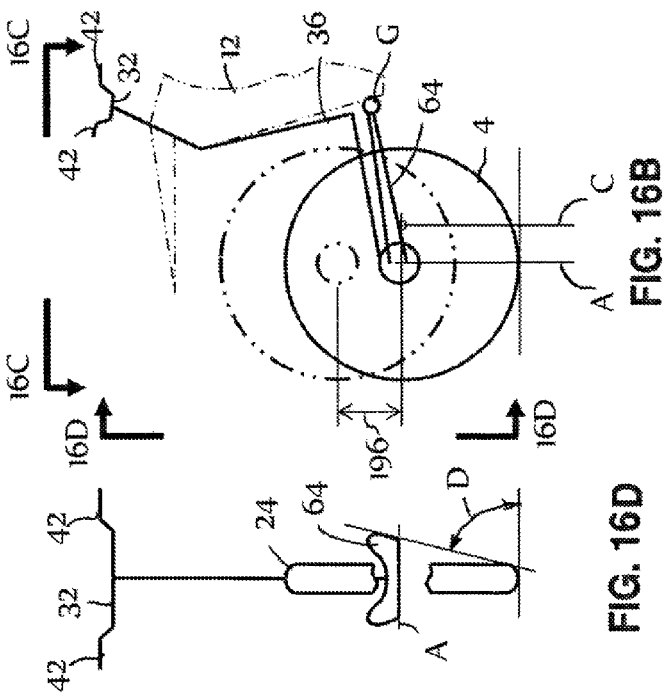
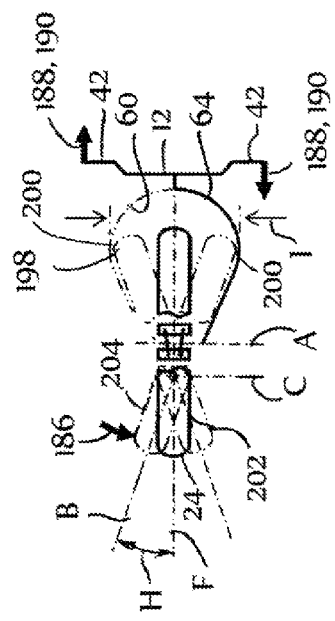
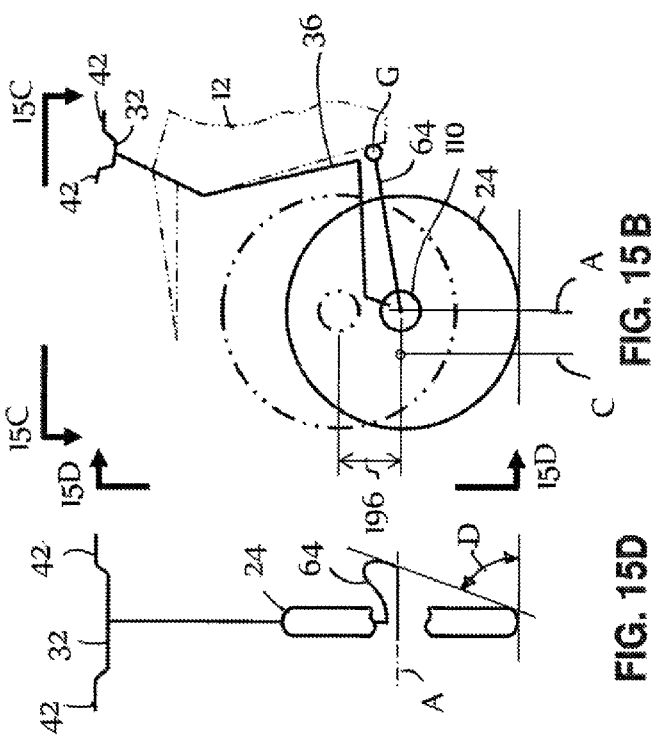

MOTORCYCLE STEERING WITH FOUR-BAR LINKAGE

CROSS-REFERENCE TO RELATED APPLICATIONS

This application is related to U.S. Pat. No. 7,887,077 entitled MOTORCYCLE STEERING issued on Feb. 15, 2011, the entire contents of which is expressly incorporated by reference herein.

FIELD

The present disclosure relates generally to motor vehicles and, more particularly, to a steering mechanism incorporating a four-bar linkage for steering control of a wheel of a vehicle.

BACKGROUND

Prior art front suspension systems for motorcycles typically comprise a pair of telescopic front forks which are attached to a front end of the motorcycle at the steering stem and which have a front wheel mounted to the lower ends of the front forks. The telescopic forks are configured to absorb shocks that may be transmitted through the telescopic forks via compression springs. The telescopic forks typically further include a damping mechanism in order to provide a dampening effect against oscillations induced in the compression springs during absorption of shocks. The telescopic front forks are pivotable through the use of handlebars for controlling the steering angle of the front wheel for directional control of the motorcycle.

Although telescopic front forks have been successfully incorporated into a majority of motorcycles produced up to the present, conventional telescopic forks suffer from several deficiencies which detract from their overall utility. For example, because the front wheel of a motorcycle is essentially cantilevered outwardly from the front end of the motorcycle at a relatively long distance from the front end, the front forks as well as the steering head and the motorcycle frame attach points for supporting the steering head must have a relatively high cross sectional moment of inertia to provide the necessary stiffness and resistance to flexure of the motorcycle frame in response to road shocks.

The high degree of stiffness in the front forks and the motorcycle frame is especially important when the motorcycle is driven at high speeds in order to avoid the development of wobble at the front wheel which can occur as a result of lateral flex in the fork legs allowing the tire contact patch to move away from the steering axis. The ability to resist undue flexing unfortunately results in an increase in weight of the front forks and motorcycle frame. To complicate the matter, heavy front forks generate relatively high inertia in the steering system which results in a steering system that is even more prone to wobble.

Another disadvantage associated with the front telescopic forks of conventional motorcycles is that the point of the steering stem where the front forks are connected to the motorcycle frame is located substantially above the motorcycle center of gravity. The relatively high connection point of the front forks further raises the center of gravity which has the unfortunate effect of reducing handling performance of the motorcycle and especially during low-speed maneuvering of the motorcycle.

A further drawback associated with conventional telescopic forks is related to the tendency of the front end of the motorcycle to dive under heavy braking as the weight of the motorcycle is transferred to the front wheel. During front-end dive, the compression springs in the front forks are further compressed which reduces the ability of the compression springs to absorb and dissipate irregularities or bumps in the road. In extreme cases, the phenomena of front-end dive presents a safety issue as the motorcycle can potentially flip forward under severe braking.

Attempts by manufacturers to reduce front-end dive include the use of stiffer compression springs in the front forks. However, the user of stiffer springs has the unfortunate counter-effect of decreasing the capability of the front fork to dissipate smaller bumps during non-braking maneuvers. Manufacturers have also attempted to improve suspensions response by employing special coatings for the forks to reduce stiction and thereby decouple the suspension system (i.e., compression springs) from the effects of road disturbances and braking of the motorcycle.

For example, certain manufacturers such as Bavarian Motor Works, Inc. (i.e., BMW) produce a line of motorcycles which employ an additional front suspension member commercially known as a Telelever™ which pivotally interconnects a lower (i.e., stationery) portion of each of the forks to the motorcycle frame as a means to prevent braking forces from traveling through the stanchion (i.e., moveable) portion of the telescopic forks. Instead, braking forces travel through the Telelever™ and thereby reduces compression of the front forks (i.e., front-end dive) that typically occurs during braking. However, the BMW Telelever™ system mounts and transfer loads to the upper portion of the frame and therefore fails to address other problems associated with conventional front fork suspension systems.

Such problems are related to front-end dive and include an increase in pressure at the contact patch of the front tire during braking which, in turn, increases the bending moment forces experienced at the steering head. The frame attach points of the steering head must have the capability to resist bending forces induced by the bending moments during braking. The need to resist bending results in an increase in the mass of the steering stem and its attach points. In addition, large braking forces transmitted through the contact patch at the front tire necessitate a generally stiff front axle to ensure that each of the telescopic forks compresses or collapses a relatively equal amount.

The ability of the front axle to resist uneven collapsing of the front forks is especially critical when the motorcycle is braking during a turn. Although a certain amount of weight transfer to the front end may be desirable in order to provide a desired amount of pressure on the front tire to temporarily increase the contact patch area and prevent front wheel sliding, an excess amount of front-end dive will result in reduced braking capability at the rear wheel to the extent that the overall braking performance of the motorcycle is adversely affected.

Another drawback associated with telescopic front forks is related to the high moment of inertia as a result of the large mass of the suspension and front wheel assembly rotating about the steering axis. The high moment of inertia can result in the development of a violent wobble at the front wheel at certain speeds. Although many manufacturers include a steering dampener to dampen oscillations occurring as a result of wobble, the added steering dampener unfortunately only further increases the weight and cost of the motorcycle.

A further drawback of conventional telescopic front forks of motorcycles is associated with the angle at which the steering stem and forks are oriented relative to vertical and which is commonly referred to as the rake angle. In conventional motorcycles, the rake angle provides a self-steering effect with increasingly greater rake angles of the fork corresponding to a higher tendency of the motorcycle to self-steer which adds some measure of straight-line stability for the motorcycle and which can be advantageous at high speed. Unfortunately, road imperfections which induce off-centered upward forces on the front tire have a tendency to steer the wheel. For example, when encountering a longitudinal rut or groove in the riding surface parallel to the direction of movement of the motorcycle, a high rake angle also makes it difficult for the rider to steer the front wheel out of the rut. In addition, the self-steer effect also causes the motorcycle to drift toward a lower portion of the riding surface on crowned roads making it difficult to steer the motorcycle out of the lower portion.

The rake angle also increases the amount by which the rider must rotate the handlebars in order to effectuate a given amount of turning of the front wheel as compared to an arrangement where the forks are oriented perpendicularly relative to the riding surface. The perpendicular orientation of the forks would provide a one-to-one correspondence between rider input at the handlebars and steering output at the front wheel. A further problem associated with rake angle is related to the fact that during front-end dive, the telescopic forks collapse or effectively shorten, the wheel base (i.e., the distance between the front and rear wheels of the motorcycle) becomes proportionally shorter. Such reduced wheelbase unfortunately decreases the straight-line stability of the motorcycle.

Telescopic fork systems suffer a further disadvantage which is related to the relatively large amount of suspension travel that is designed into the motorcycle in order to allow the front wheel to deflect sufficiently when encountering certain terrain conditions and obstacles. Generally, suspension travel can be defined as the distance over which the front wheel must be able to freely move without limitation in order to effectively absorb and dissipate bumps in the riding surface and accommodate the weight of the rider and the motorcycle. Unfortunately, the relatively large amount of front-end dive in motorcycles equipped with conventional front forks necessitates a correspondingly large amount of front wheel travel which, in turn, increases the overall frontal area of the motorcycle and the attendant aerodynamic drag at speed.

In light of the above-noted limitations, the prior art includes several attempts to overcome deficiencies associated with steering of various vehicles and, more particularly, front wheel steering and suspension systems for motorcycles. For example, U.S. Pat. No. 364,335, issued to Burdess, discloses a velocipede such as a bicycle or a tricycle incorporating a steering mechanism for a front wheel mounted in a fork. The steering mechanism includes a plunger that compresses a spring contained within a cylinder when the wheel is turned such that the front wheel is biased toward its normal straight-line position in order to enhance stability of the velocipede.

U.S. Pat. No. 388,043, issued to House, discloses a velocipede or bicycle wherein opposing ends of the axle of the front wheel are connected to the bicycle frame by a pair of connecting rods. The connecting rods are constructed of bent form to provide room for turning of the wheel from left to right. The forks upon which the ends of the axle are mounted extend upwardly to a tiller or handlebars. A longitudinal slot is provided in the frame at the junction with the forks to provide adjustability with respect to the length of the connecting rods which connect the axle to the frame.

U.S. Pat. No. 431,061, issued to Kenney, discloses a velocipede having a steering wheel supported by a pivoted fork. The fork is connected with a cross bar or yoke having opposing ends which are connected by links to a similar cross bar which itself is connected to an upright shaft provided with a steering handle. Upon turning the steering handle, the front wheel is turned via the pair of links.

U.S. Pat. No. 477,583, issued to Van Bibber, discloses a bicycle having a front wheel supported by a fork which extends upwardly to a T-head having laterally projecting arms extending equally outwardly therefrom to form a transverse cross bar. The bicycle includes handlebars supported on a vertical member having a pair of laterally projecting arms of equal length forming a second transverse cross bar parallel with the transverse cross bar mounted above the forks. A pair of horizontal links are connected to the ends of each of the transverse cross bars such that turning motion of the handlebars is translated into turning motion of the forks for steering the bicycle.

U.S. Pat. No. 501,501, issued to Gehricke, discloses a child's cycle having a front steering wheel that is of small diameter to allow for the figure of a horse to be mounted thereabove. The front wheel is spaced forward of the rear wheel such that the legs of the user do not come into contact with the hind legs of the horse. A steering mechanism is provided to accommodate the forward placement of the front wheel and comprises a cross bar mounted above the fork which is connected by a pair of links to a corresponding cross bar connected to the handlebars by which the child's cycle may be turned.

U.S. Pat. No. 538,482, issued to Doan et al, discloses a tricycle supported by a front wheel. A front fork supports the front wheel and is pivoted in the frame of the tricycle. A cross-head mounted on top of the fork is connected to a steering lever by a pair of connecting links such that turning of the steering lever effectuates turning of the front wheel.

U.S. Pat. No. 1,175,744, issued to Giles, discloses a steering mechanism for cycles which comprises a mechanism that substitutes a steering wheel for conventional bicycle handlebars. The front wheel of the bicycle is supported by a fork having a laterally extending member mounted. The lateral extending member is connected at each of its opposing ends by a pair of links connected to opposing ends of a turning arm. The turning arm is connected to the steering wheel for guiding or directing the bicycle.

U.S. Pat. No. 1,262,625, issued to Berlin et al, discloses a steering device for a motorized plow wherein the front wheel is supported by a pair of forks having a transverse lever mounted on a forward end of the forks. An arm is positioned forward of the transverse lever in parallel relationship thereto. The transverse lever and arm are connected by a pair of links. The end of a steering shaft is pivotally mounted to a forward part of the arm such that when the steering shaft is turned left or right, the forks are turned enabling turning control of the motorized plow.

U.S. Pat. No. 1,623,726, issued to Herds, discloses a steering mechanism for a motor vehicle comprising a pair of horizontally oriented spring members extending from opposing sides of an axle of a front wheel of a vehicle. Opposing ends of the spring members are in turn connected to a pivotable casting. The casting is rigidly secured to a lower end of a vertically oriented pivot member. Rigidly secured to an upper end of the pivot member is a crank member which is secured to a rotatable steering shaft connected to the steering wheel of the vehicle. Turning of the steering wheel effectuates pivoting of the pivot shaft for controlling the directional movement of the front wheel.

U.S. Pat. No. 2,038,843, issued to Jones, discloses a three-wheeled automobile having two driving wheels in front and one steering wheel behind. The rear wheel is mounted on a rearwardly extending arm pivotally connected to a forwardly extending arm. The forwardly extending arm is mounted on an upright steering spindle whose vertical axis is located aft of the rotational axis of the rear wheel. A steering segment is fixed to the forwardly extending arm and has teeth which mesh with a steering worm gear connected to the steering wheel by means of a shaft to enable directional control of the aft steering wheel.

U.S. Pat. No. 2,199,966, issued to Timm, discloses a hydraulic actuator for a steering mechanism. A hydraulic actuator is connected to the wheel by means of a steering arm mounted atop a fork which has the wheel mounted therewithin. The fork is also connected to an equalization bar which is in turn connected to a control valve by a pair of links. The hydraulic actuator is specifically adapted to allow steering of the wheel at a pre-determined distance and rate best suited for the terrain and speed conditions.

U.S. Pat. No. 2,339,582, issued to Peterson, discloses a castor wheel such as may be used on agricultural machines. The castor wheel is mounted in a fork having an arm mounted on a pivot shaft attached to the fork. Cross links connect opposing ends of the arm to a pedal lever controlled by the operator. The castor wheel minimizes the tendency for the rear end of the machine to slip sideways down a hill or for the castor wheel to swing freely or wobble.

U.S. Pat. No. 2,510,798, issued to Cahill, discloses a single wheel steering mechanism wherein a wheel is carried by a vertically disposed fork mounted on the wheel axle having extending end portions. The opposing ends of the extended portions are, in turn, connected to a foot bar by a pair of connecting rods. The foot bar is in turn connected to a tiller or handle bar by a vertical shaft such that swinging the handlebars to the right or left effectuates a corresponding steering of the wheel.

U.S. Pat. No. 2,580,064, issued to Albright, discloses a fluid pressure-operated steering device wherein a pair of hydraulic motors are alternately operated in order to effectuate turning of a wheel mounted to a telescopic shock-absorbing landing gear. The steering device provides dampening of shimmying tendencies in order to eliminate tortional vibrations of the landing gear.

U.S. Pat. No. 3,110,352, issued to McClarnon, discloses a wheeled vehicle steering device wherein wheels on forward and aft ends of the vehicle are cooperatively interconnected such that the wheels are turned in opposite directions to allow for very small turning radii. The steering of the forward and aft wheels is effectuated by handlebars actuating a steering post connected with the wheel steering unit by a set of linkages. One of the wheels of the vehicle is a freely castoring front wheel which swings to a complementary position dependent upon the turning radius.

U.S. Pat. No. 3,521,904, issued to Sheffer, discloses a vehicle structure having a front wheel that is steerable by pivotal movement of a handlebar unit connected to a connector bar. A pair of links attached to opposing ends of the connector bar are pivotally attached to a yoke or fork straddling the front wheel. The yoke and, hence, the wheel structure are pivotally moved in response to pivotal movement of the handlebar unit for steering the vehicle structure.

U.S. Pat. No. 4,353,567, issued to Weldy, discloses a steering and suspension system for a front wheel of a three-wheeled vehicle. The steering system includes a pair of suspension frames that pivotally support the front wheel. A pair of steering arms are pivotally connected to the suspension frames at one end thereof. An opposite end of each of the steering arms is pivotally connected to the vehicle's front cross frame member. Each steering arm moves in an arcuate path in response to a linkage that is actuated by a driver in a manner causing one steering arm to pivot inwardly in a direction opposite to the direction of desired turn of the wheel while the other steering arm pivots outwardly in such a manner that the wheel is leaned into the turn.

U.S. Pat. No. 4,685,694, issued to Kouyama, discloses a steering apparatus including an angle-increasing-mechanism allowing for large steering angles to be imparted to the steering wheel in response to small pivotal angles of the handlebars. The handlebars are pivotally connected to a top plate located forward of the handlebars and interconnected by a pair of connecting rods. The distance from the handlebar pivot to the connecting rod at one end is greater than the distance of the top plate pivot to the connecting rod at the opposing end. This difference results in an increasingly large pivot angle of the top plate with respect to that of the handlebars to thereby form the angle-increasing-mechanism allowing relatively sharp radius turns with smaller angular input at the handlebars.

U.S. Pat. No. 4,773,499, issued to Frye, discloses a steering mechanism having a forkless steerable wheel and axle structure having a hydrostatic motor integrated therewithin. The axle structure is steerable by means of a pair of left and right actuators that cooperate to effectuate steering of the wheel. More specifically, a piston rod of one of the actuators is extended while the opposing piston rod of the remaining actuator is retracted causing the center of the wheel to shift to the right or left depending upon the direction of steering.

U.S. Pat. No. 5,820,439, issued to Hair, III, discloses a gyro-stabilized remote controlled toy motorcycle having a front wheel that is supported for rotation on a fork that is coupled to a steering post. The steering post is inclined aftwardly with its axis passing through the axis of the front wheel to provide a castor effect which tends to turn the front wheel toward the direction in which the motorcycle is leaning which thereby biases the motorcycle toward an upright position when in motion.

U.S. Pat. No. 6,120,048, issued to Li, discloses an auxiliary steering device such as for a tricycle which provides secondary steering in addition to the handlebars. The secondary steering device is connected to the handlebars by two connection rods to enable an adult to manipulate the steering of the handlebars from behind the tricycle.

U.S. Pat. No. 6,786,796, issued to Suto, discloses a radio controlled two-wheeled vehicle toy including a main body having a front fork that is rotatably mounted on the main body. A front wheel mounted to the front fork may be directionally controlled by a steering control portion mounted on a front side of the main body.

U.S. Application No. 2006/0037797 and U.S. Application No. 2006/0037799, filed by Mathon, disclose a motorcycle having a dual beam chassis and a steering mechanism comprising a handlebar linkage controlling a front wheel mounted to the motorcycle. The steering linkage is located inside a tubular front fender housing and comprises a steering shaft extending through a fixed tube and which is coupled to a rotatable tube upon which the wheel is mounted. The steering shaft is driven by an angular miter gear engaged to an identical gear driven by the steering linkage. A four-bar-linkage disposed adjacent the handlebar communicates angular motion to drive the miter gear which, in turn, engages the steering shaft to provide directional control of the front wheel.

U.S. Pat. No. 4,265,329, issued to de Cortanze, discloses a frameless motorcycle having a steering mechanism comprises of a handlebar rotatably mounted to a motor of the motorcycle. A control rod extends from the handlebars to a pivoting bracket which, in turn, is connected at an opposite end to a rotatable triangular element mounted on a swing arm extending in a forward direction of the motorcycle. The front wheel is mounted on a swing arm in such a manner that the triangular element which is linked to the handlebars may pivot about an inclined axis in order to effectuate directional control of the front wheel of the motorcycle.

U.S. Pat. No. 4,526,249, issued to Parker, discloses a front suspension system for a motorcycle comprising a pair of upper and lower control arms extending forwardly from the body of the motorcycle. Each of the control arms is connected to a kingpin extending downwardly along one side of the front wheel. The upper end of the king pin is connected to a steering shaft that in turn is connected to the handlebars of the motorcycle such that turning of the handlebars causes the king pin to pivot about the forward end of the lower control arm to effectuate directional control of the front wheel during steering.

U.S. Pat. No. 4,702,238, issued to Trema, discloses a suspension device for a motorcycle wherein the front and rear suspension systems are coupled in a manner which facilitates control of the suspension-shock absorber interaction. The front wheel steering-suspension system comprises an upper arm disposed parallel to a lower arm each hinged to the front chasse and cooperating to support the front wheel. A pivot support is mounted on a forward end of the lower arm and is connected by a rod to the steering handlebars to facilitate directional control of the front wheel.

U.S. Pat. No. 4,741,545 issued to Honma, discloses a front wheel steering device for a motorcycle comprising upper and lower swing arms having their rear ends pivotally joined to the engine case. The front wheel is steerably supported by a knuckle to which an axle of the front wheel is mounted. The forward ends of the upper and lower swing arms are pivotally connected to the knuckle member. The knuckle is angularly moveable for steering the front wheel via the handlebars.

U.S. Pat. No. 4,890,857 issued to de Cortanze, discloses a steerable wheel mechanism for land vehicles having a steering mechanism that is similar to that described above for the de Cortanze '329 reference.

U.S. Pat. No. 5,133,223, issued to Morri, discloses a device for steering a front wheel of a motorcycle and which comprises at least one arm pivotally anchored at its rearward position to the motorcycle frame. The rim of the front wheel is supported by an outer hub within which is coaxially disposed an inner hub. The inner hub is pivotally mounted on a steering pivot which, in turn, is fixedly secured to an axle extending from the forward end of the support arm. A lever is rigidly mounted to the inner hub and is connected to the handlebars by means of a control rod in order to effectuate directional control of the front wheel by pivotal movement thereof about the pivot.

U.S. Pat. No. 5,361,864, issued to Tanaka and U.S. Pat. No. 5,782,313, issued to Kurawaki et al disclose a front wheel swing arm type steering and suspension system for a motorcycle which is constructed similar to the arrangement described above for the Honma '545 and Parker '249 references.

U.S. Pat. No. 3,539,196, issued to Fleming, discloses a vehicle steering assembly for controlling a steerable wheel. The wheel is rotatably mounted on an axle member having opposed ends each of which is connected to supporting struts. The struts extend aftwardly and are pivotally connected at fixed pivot points to a frame of the motorcycle in spaced relation to one another. The strut together with the axle member and the spaced pivot points form a closed four-bar-mechanism in the form of an isosceles trapezoid. The vehicle is steered by pivoting the strut members such that the axle and, hence, the wheel are simultaneously rotated and laterally translated with respect to the vehicle.

U.S. Pat. No. 6,095,891, issued to Hoeting and U.S. Application No. 2006/0009119, filed by Hoeting, disclose a remote control toy vehicle comprising a four-bar-mechanism connecting a front castoring wheel to a chassis of a motorcycle. The front wheel of the motorcycle is mounted on a pair of telescoping front forks extending upwardly to the four-bar-mechanism. The four-bar-mechanism is comprised of left and right spaced members, a fork coupler and a front end frame. The fork coupler is connected to the front fork. The toy vehicle includes a link which is operatively connected to a steering drive and to the four-bar-mechanism on the opposite end in order to deliver steering outputs to the front fork to impart left or right pivoting motion to the front wheel.

Although some of the above-referenced patents disclose steering mechanisms and suspension systems for overcoming certain deficiencies associated with telescopic front forks such as front-end dive, none of the references are understood to disclose an arrangement wherein all of the above-mentioned drawbacks associated with telescopic forks are addressed. More specifically, none of the above-mentioned references are understood to disclose a wheel steering and suspension system of reduced overall mass and which allows for a relatively lower center of gravity and improved handling of a motorcycle.

As can be seen, there exists a need in the art for a steering mechanism for a vehicle such as a motorcycle which minimizes or eliminates the problems associated with front-end dive during heavy braking. Furthermore, there exists a need in the art for a steering mechanism for a vehicle which provides a means for improved suspension and handling performance during braking and in response to longitudinal ruts or grooves in the road surface over which the motorcycle may be traveling. Additionally, there exists a need in the art for an improved steering mechanism which minimizes the steering force required at the handlebars in order to achieve a given steering angle in the front wheel as compared to the steering force required in conventional telescopic front fork systems. Furthermore, there exists a need in the art for a steering mechanism that maximizes the lean angle of the motorcycle to improve clearance of the motorcycle relative to the ground surface over which the motorcycle is travelling. Finally, there exists a need in the art for a steering mechanism and suspension system for a motorcycle which is of light weight and low cost and which lowers the overall center of gravity of the motorcycle as compared to motorcycles having conventional telescopic front forks.

SUMMARY

The above-described deficiencies and drawbacks associated with conventional front fork systems are specifically addressed and alleviated by a steering mechanism as disclosed herein which incorporates a four-bar linkage comprised of a ground link, follower links, and a coupler link. Importantly the coupler link is located aft of the ground link and is interconnected to the ground link by a pair of the follower links. Advantageously, the aft placement of the coupler link relative to the ground link provides stability to a wheel moving in a forward direction. In this regard, the location of the coupler link aft of the ground link results in a wheel-centering force that tends to return the wheel toward a neutral position in general alignment with a longitudinal vehicle axis of the motorcycle.

The follower links are advantageously oriented at converging angles relative to one another along a direction from the ground link to the coupler link. The converging angles of the follower links result in a steering axis (i.e., instantaneous steering center) that is located aft of the wheel centerline. Advantageously, the location of the steering axis aft of the wheel centerline minimizes lateral (i.e., side-to-side) travel of the aft portion of the wheel as the wheel is pivoted through a given steering angle relative to the increased lateral travel of the aftmost portion of a wheel having a steering axis located forward of the wheel centerline. In the context of a motorcycle, minimizing lateral movement of the aftmost portion of the wheel reduces the width of the swingarm to which the wheel is mounted. The reduced width of the swingarm may improve clearance of the motorcycle with obstacles and may increase the lean angle of the motorcycle relative to a ground surface over which the motorcycle is travelling.

Although the steering mechanism of the present disclosure may be configured for use on a wheel of any vehicle requiring steering, the steering mechanism is described in the context of a four-bar linkage mounted on a swingarm coupled to a forward end of a motorcycle. The ground link of the four-bar linkage may be connected to the swingarm and may be oriented generally perpendicular to a vehicle axis extending between the front and rear wheels of the motorcycle. The coupler link may be coupled to a wheel hub of the front wheel of the motorcycle.

The features, functions and advantages that have been discussed can be achieved independently in various embodiments of the present disclosure, or may be combined in yet other embodiments, further details of which can be seen with reference to the following description and drawings below

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 12 is a plan view of the swingarm and the front wheel taken along line 12 of FIG. 5;

FIG. 13 is a schematic top view of the four-bar linkage and illustrating the steering angle of the wheel provided by the location of the steering axis aft of the wheel centerline;

FIG. 14A is a table listing the wheel-centering forces at different steering angles of the front wheel of a motorcycle having conventional telescopic front forks;

FIG. 15A is a table listing the wheel-centering forces at different steering angles for a motorcycle having a four-bar linkage steering mechanism wherein the steering center is located forward of the wheel centerline;

FIG. 15B is a schematic side view of the motorcycle having the four-bar linkage with the steering center located forward of the wheel centerline;

FIG. 15C is a schematic top view of the motorcycle of FIG. 15B and illustrating the steering angle and the lateral travel of the aftmost portion of the wheel having the steering axis located forward of the wheel centerline;

FIG. 15D is a front view of the motorcycle of FIG. 15B and illustrating a lean angle defined by a width of the swing arm;

FIG. 16A is a table listing the wheel-centering forces at different steering angles for a motorcycle having a four-bar linkage steering mechanism wherein the steering center is located aft of the wheel centerline;

FIG. 16B is a schematic side view of the motorcycle having the four-bar linkage with the steering center located aft of the wheel centerline;

FIG. 16C is a schematic top view of the motorcycle of FIG. 16B and illustrating the steering angle and the lateral travel of the aftmost portion of the wheel having the steering axis located aft of the wheel centerline; and FIG. 16D is a front view of the motorcycle of FIG. 16B and illustrating an increased lean angle defined by a reduced width of the swing arm due to the minimal amount of lateral travel of the wheel.

DETAILED DESCRIPTION

Figure 1:
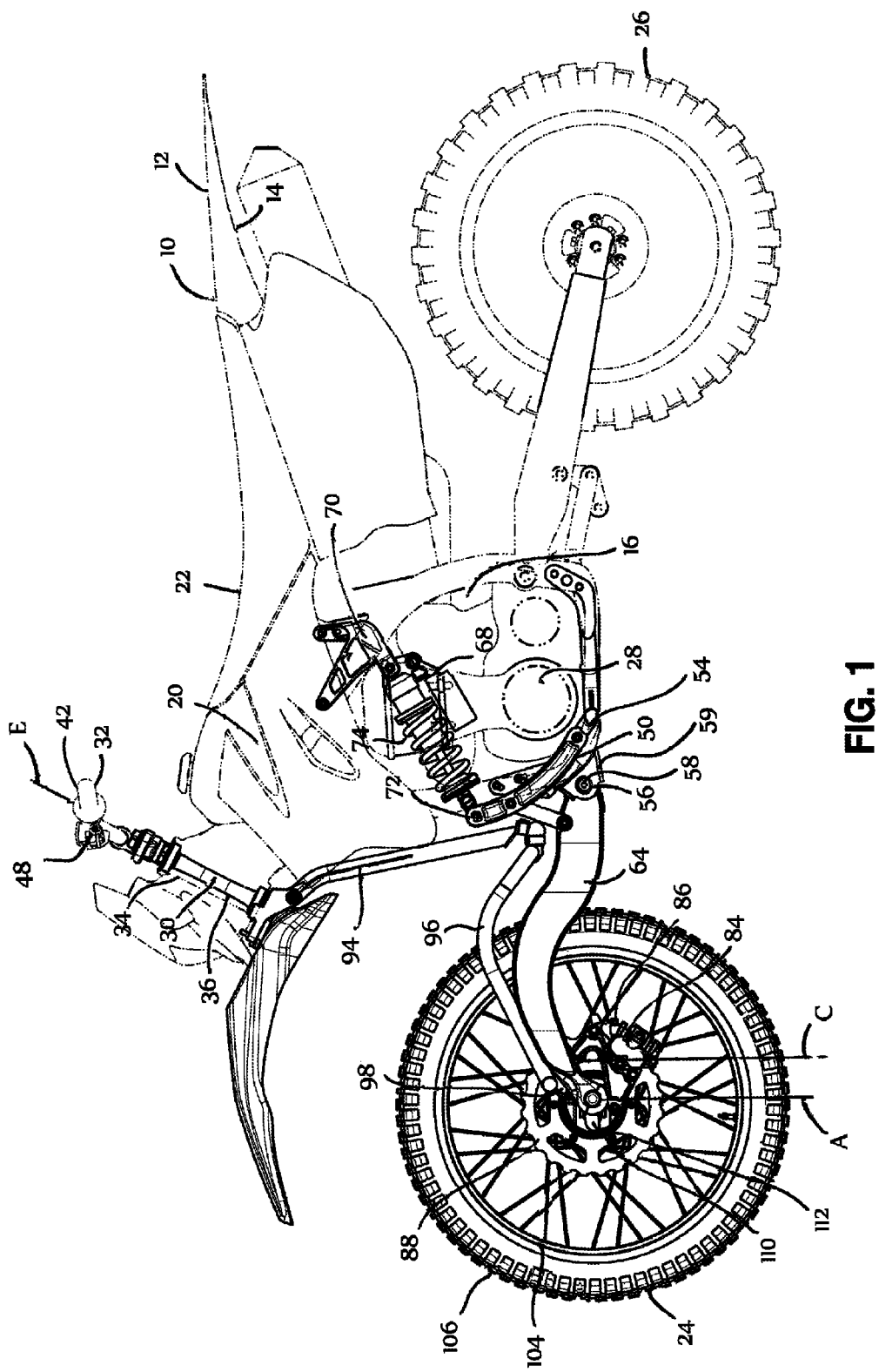
FIG. 1 is a side view of a motorcycle having a four-bar linkage steering mechanism connected to a swingarm that may be mounted to a front end of a motorcycle.
Figure 9:
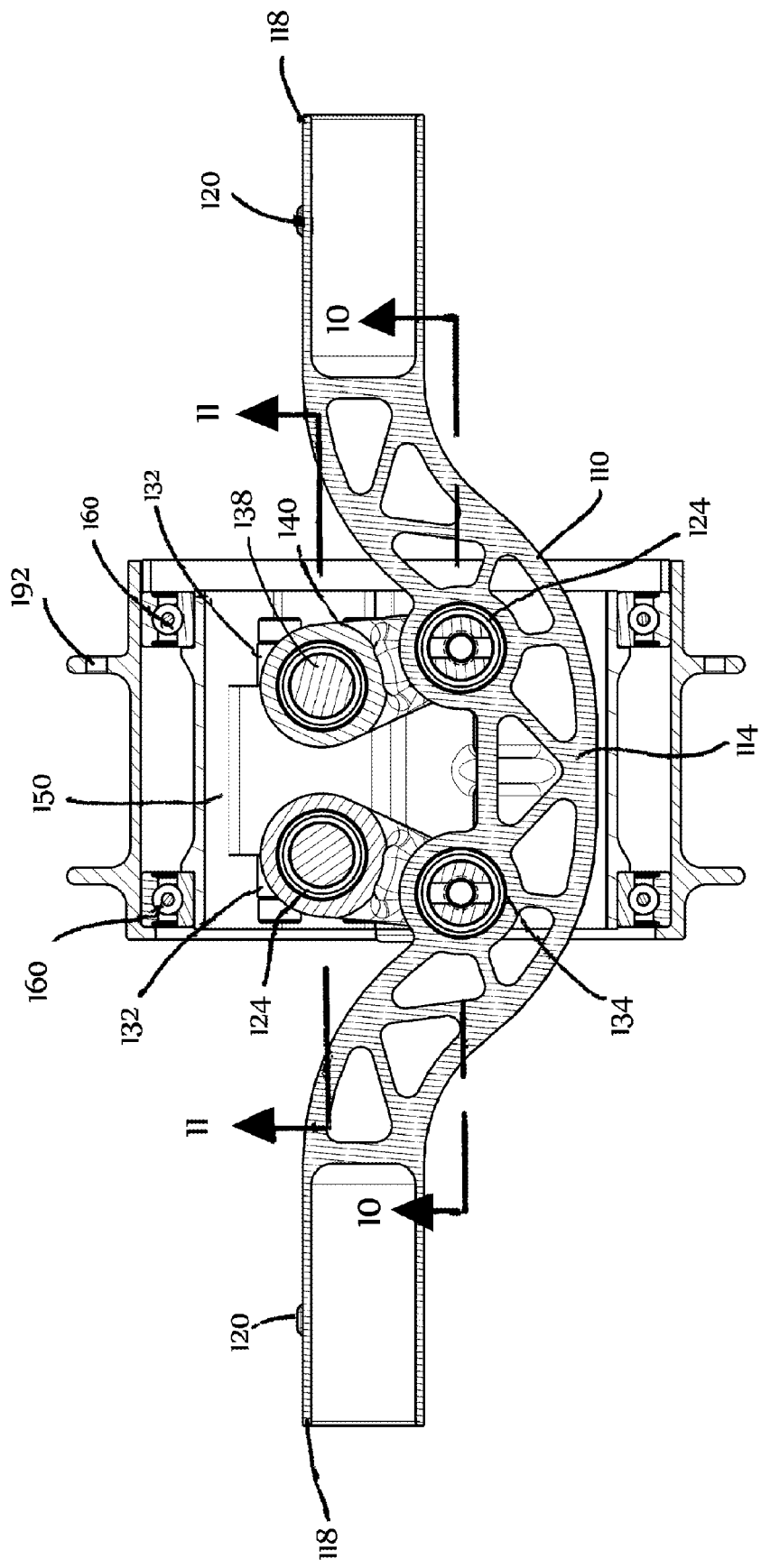
FIG. 9 is a top sectional view of the four-bar linkage taken along line 9 of FIG. 6 and illustrating the ground link, the follower links, and the coupler link that may be at least partially housed within the wheel hub.

Referring now to the drawings wherein the showings are for purposes of illustrating various embodiments of the present disclosure, shown in FIG. 1 is a side view of a motorcycle 12 having a steering mechanism 36 attached to a front end of the motorcycle 12. In a broad sense, the steering mechanism 36 is comprised of a four-bar linkage 110 (FIG. 9). The four-bar linkage 110 includes a ground link 112, a coupler link 150, and a pair of follower links 140 pivotally connecting the ground link 112 to the coupler link 150.

Importantly, the four-bar linkage 110 of the present disclosure represents an improvement over prior art four-bar mechanism for steering a wheel. More specifically, in the present disclosure, the follower links 140 extend aftwardly from the ground link 112 at converging angles and define a steering axis C (FIGS. 1, 13, 16B, 16C) that is located aft of the wheel centerline A. The location of the steering axis C aft of the wheel centerline A advantageously minimizes lateral (i.e., side-to-side) travel 200 (FIG. 16C) of the aftmost portion 198 (FIG. 16C) of the wheel 24 as the wheel 24 is pivoted through a given steering angle H (FIG. 16C) relative to the increased amount of lateral travel 200 (FIG. 15C) of the aftmost portion 198 (FIG. 15C) of a wheel 24 having a steering axis C that is located forward of the wheel centerline A (FIGS. 15B, 15C).

Although the steering mechanism 36 of the present disclosure may be implemented for use on any type of wheel for any type of vehicle, in the present disclosure, the steering mechanism 36 is described in the context of a four-bar linkage 110 mounted on a swingarm 64 of a motorcycle 12 as shown in FIGS. 1-13. The ground link 112 may be non-rotatably mounted to the swingarm 64. In an embodiment, the ground link 112 may be oriented generally perpendicular to a vehicle axis F (FIG. 13) which extends between the front and rear wheels 24, 26 of the motorcycle 12. The coupler link 150 (FIG. 3) may be connected to a wheel hub 192 of the front wheel 24 of the motorcycle 12. The follower links 140 interconnect the coupler link 150 to the ground link 112.

As indicated above, the converging angle of the follower links 140 results in the steering axis C being located aft of the wheel centerline A which results in minimal lateral travel 200 of the aftmost portion 198 of a pivoting front wheel 24. In the context of a motorcycle 12, minimizing lateral movement of the aftmost portion 198 of the front wheel 24 reduces the swingarm width of a swingarm 64 to which the wheel 24 is mounted. The reduced swingarm width may improve clearance of the motorcycle 12 with obstacles and may increase the lean angle D of the motorcycle 12 relative to a ground surface over which the motorcycle 12 is travelling.

In addition, the four-bar linkage 110 provides a self-stabilizing effect during forward motion of the motorcycle 12. In this regard, the four-bar linkage 110 overcomes the above-mentioned drawbacks associated with non-perpendicular steering axis arrangements associated with conventional telescopic front forks 180 (FIG. 13B, 13C). In the present disclosure, the four-bar linkage 110 provides for a steering axis C that is oriented non-perpendicularly relative to the ground. The non-perpendicular orientation of the steering axis C makes the motorcycle 12 prone to self-steering as a result of off-center upward forces acting on the front wheel 24 of the motorcycle 12. In this regard, the four-bar linkage 110 of the present disclosure allows for a generally vertical orientation of the steering axis C and may prevent the transmission of off-center upward forces at the front wheel 24 to the handlebars 32 of the motorcycle 12.

Referring still to FIG. 1, shown is the motorcycle 12 which incorporates the steering mechanism 36 on the front end thereof. The motorcycle 12 may be steered at the front wheel 24 by means of handlebars 32. The rear wheel 26 may be driven by a motor providing power through a transmission and a chain/sprocket arrangement, a belt drive system, or a shaft drive system. Although the following description and illustrations in the figures are in relation to incorporating the steering mechanism 36 on a motorcycle 12, it should be noted that the steering mechanism 36 may be incorporated for use on any motorized or non-motorized vehicle having at least one steered wheel. For example, it is contemplated that the steering mechanism 36 may be incorporated for use on a motor vehicle such as at the front wheels of an automobile or a truck. In addition, the steering mechanism 36 may be incorporated on any vehicle 10 whether for use on public roads or in off-road environments where it is desirable to separate steering forces from off-center upward forces acting on the front wheel 24.

Figure 2:
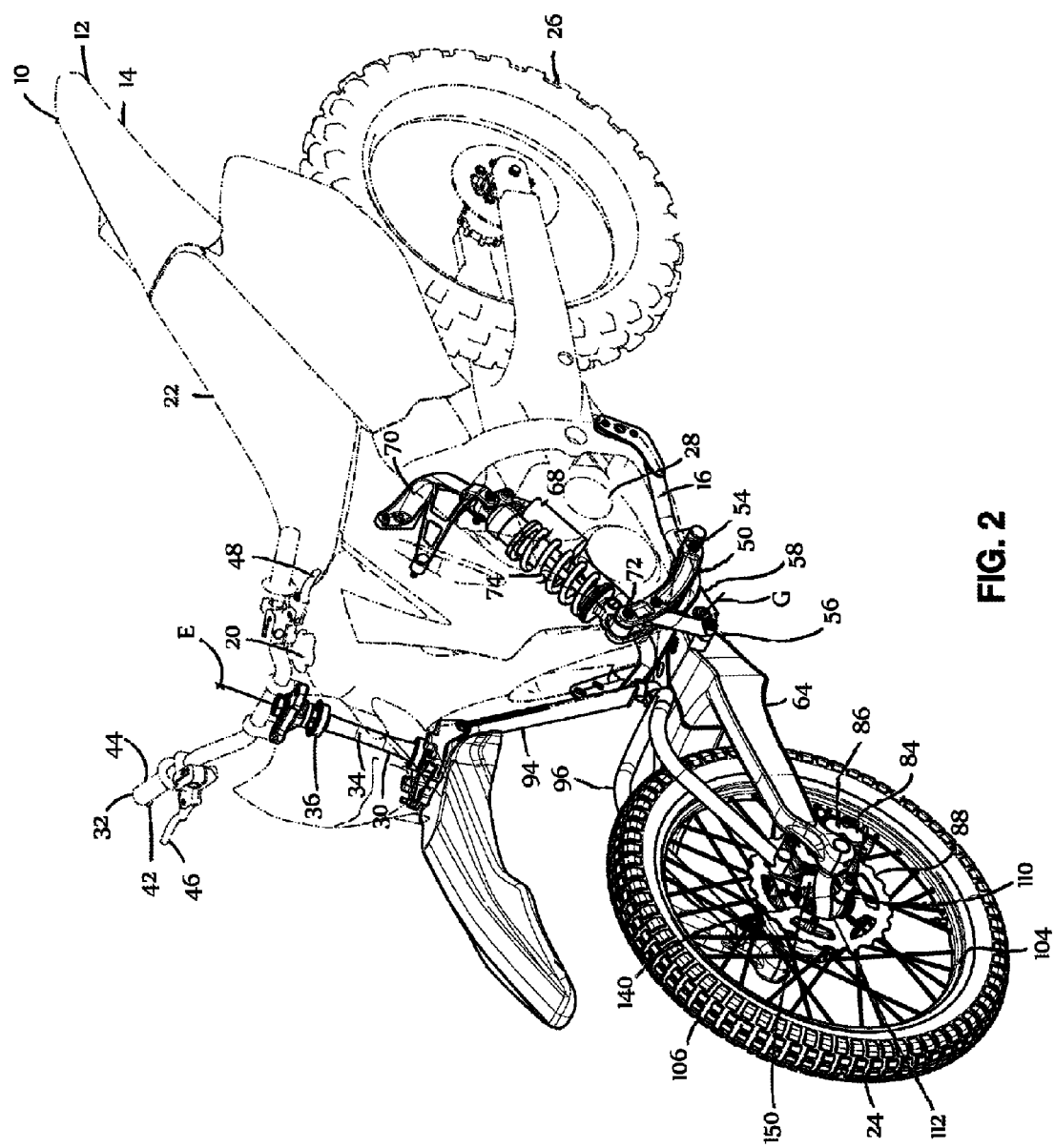
FIG. 2 is a perspective view of the motorcycle illustrating the four-bar linkage mounted on a free end of the swingarm.

In FIGS. 1-2, the motorcycle 12 may include a motorcycle frame 16 or chassis 14 which is supported by the front and rear wheels 24, 26. The front and rear wheels 24, 26 of the motorcycle 12 define the vehicle axis F which may be oriented generally parallel to a direction of forward motion of the motorcycle 12. Certain motorcycles 12 may integrate an engine as a structural or load-carrying frame member through which static and dynamic forces may be transmitted. The engine may be of the reciprocating variety having one or more cylinders and operating in any suitable aspiration mode or the engine may be a non-internal combustion engine. The steering mechanism 36 described herein may be adapted for use with or may be connected to a motorcycle frame 16 and/or to one or more engine structural members.

The motorcycle 12 may include a seat 22 and a gas tank 20 which may be mounted generally above the engine 28 in such a manner that a rider's arms may reach forward of the gas tank 20 to grasp the handlebars 32 for steering the motorcycle 12 and for regulating various other functions. In this manner, the handlebars 32 function as the steering drive 30 for the motorcycle 12. The handlebars 32 may include controls such as a throttle 44, a brake lever 46, a clutch lever 48, and various other controls such as an engine kill switch, turn signal controls, and headlight controls. The motorcycle 12 may further include a suspension system 68 configured to support the weight of the motorcycle 12 and/or a rider. In addition, the suspension system 68 may be configured to accommodate vertical deflection of the wheel 24 such as when the motorcycle 12 is travelling over uneven terrain. In this regard, the suspension system 68 may include a shock absorber 74. The shock absorber 74 may be coupled to the motorcycle 12 such as via an upper shock mount frame 70. A lower shock mount frame 72 may couple the shock absorber 74 to the swingarm 64.

As shown in the figures, the handlebars 32 may be mounted on a set of brackets which may be coupled to a head tube 34 or steering stem that may be pivotally mounted to the motorcycle frame 16. The head tube 34 may be pivotable about a handlebar pivot axis E when the rider turns the handlebars 32 left or right. The head tube 34 may be connected to an upper steering link 94 that may extend downwardly from the head tube 34. The upper steering link 94 may be coupled to a lower steering link 96 such as by means of a universal joint (not shown) or a ball and socket fitting (not shown) interconnecting the upper and lower steering link 94, 96. The lower steering link 96 may be coupled to the wheel hub 192. For example, the lower steering link 96 may comprise a fork-shaped member that may extend along opposite sides of the wheel 24 and may be connected to the wheel hub 192 by means of steering brackets 98. The steering mechanism 36 may be configured such that when the rider turns the handlebars 32 left or right, the lower steering link 96 may impart lateral motion to the coupler link 150 in the corresponding left or right direction which may result in pivoting motion of the front wheel 24 to the corresponding left or right.

Figure 3:
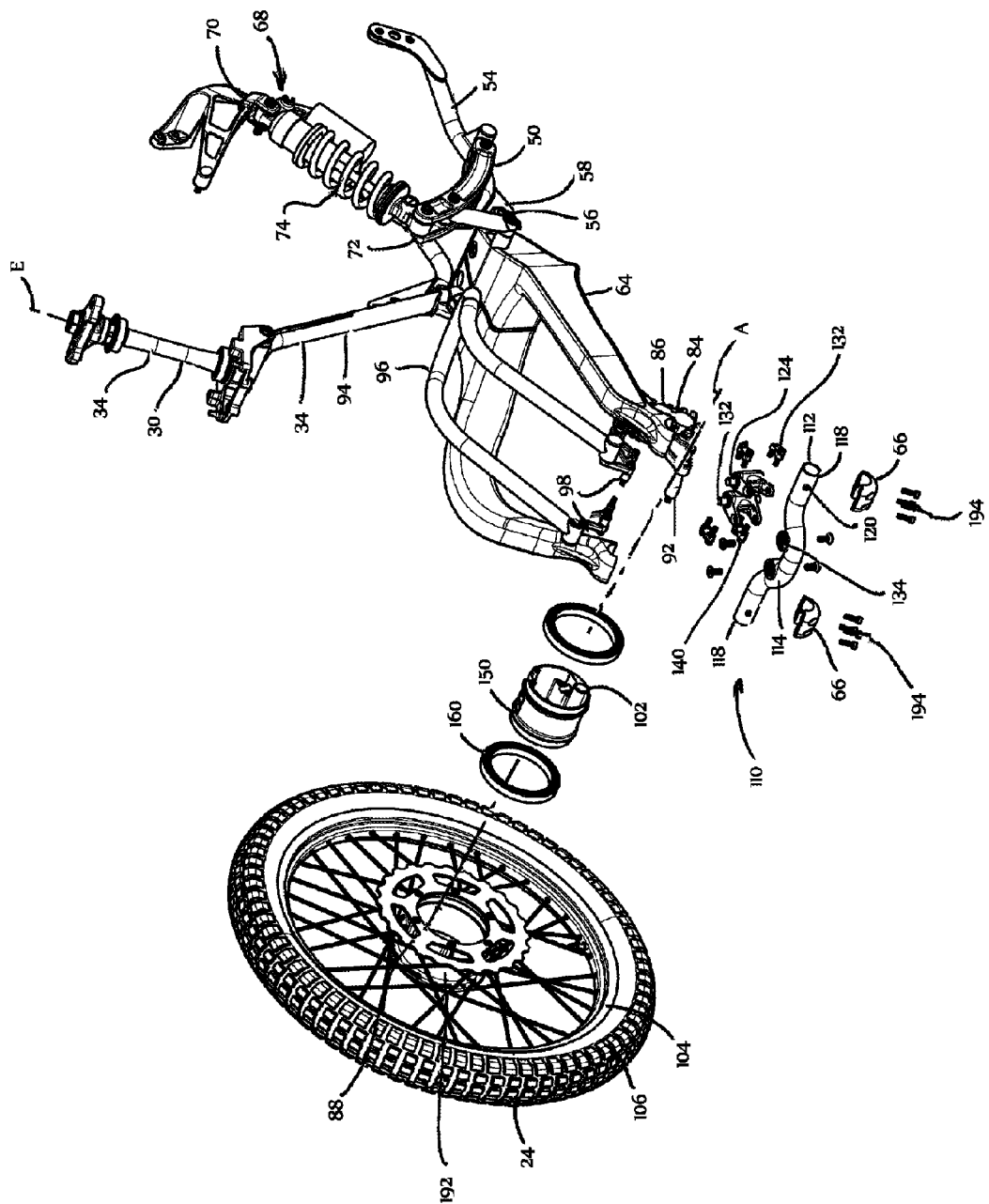
FIG. 3 is an exploded perspective view of the steering mechanism illustrating the components that make up the four-bar linkage and their connectivity to a front wheel hub of the motorcycle.

Referring to FIG. 3, shown is an exploded perspective view of the steering mechanism 36. The front wheel 24 may include a rim 104 having a tire 106 mounted thereon. The rim 104 may be attached to the wheel hub 192 by means of a plurality of spokes. The wheel hub 192 may be rotatably coupled to the coupler link 150 by means of a pair of wheel bearings 160. The coupler link 150 may have a generally hollow cylindrical configuration for housing the ground link 112 and the follower links 140.

In the embodiment shown, the ground link 112 may include a beam portion 114 and a pair of end portions 118 located on opposite sides of the beam portion 114. The beam portion 114 may be housed within the coupler link 150. The ground link 112 may be coupled to the swingarm 64 such as to the free ends of the swingarm 64 by means of mechanical fasteners 194 extending through a pair of clamps 66. However, the ground link 112 may be secured to the swingarm 64 by any one of a variety of different configurations and is not limited to the clamps 66 illustrated in the figures. The follower links 140 may be rotatably coupled to the ground link 112 by means of upper and lower bearings 124 as described in greater detail below. Likewise, the follower links 140 may be rotatably coupled to the coupler link 150 by means of a pair of follower link shafts 138 that may be rotatably supported on bearings 124 and secured by mechanical fasteners 194 as described below.

Figure 4:
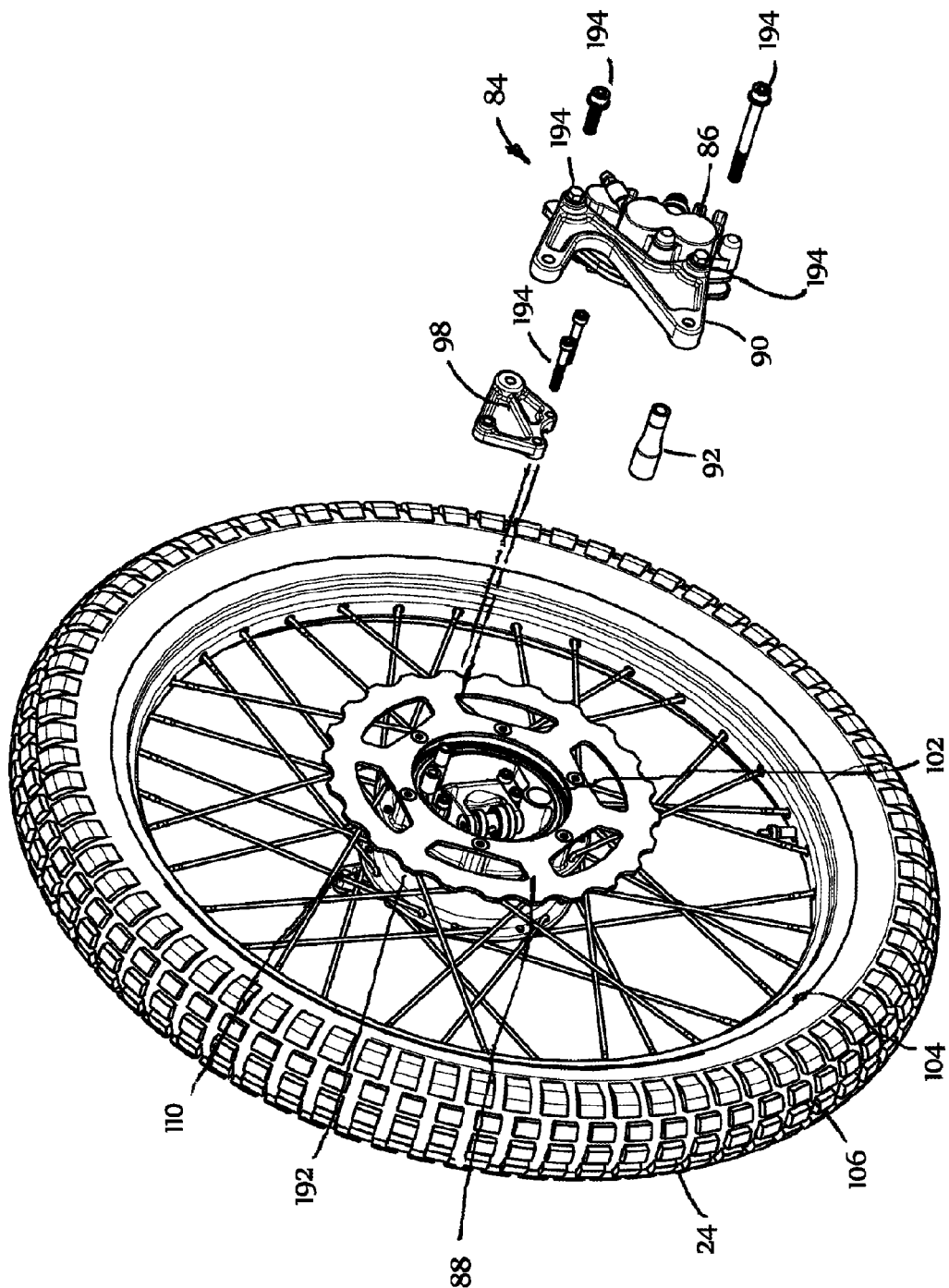
FIG. 4 is an exploded perspective view of the front wheel and a brake caliper that may be included with the front wheel.

Referring to FIG. 4, shown is a partially exploded perspective view of the front wheel 24 having a disc brake system 84 that may be mounted to the front wheel 24. In the embodiment shown, the front wheel 24 may include a brake rotor 88 which may be mechanically fastened to the wheel hub 192 on one or both sides thereof. The caliper mounting bracket 90 may be secured to the wheel hub 192 by means of a spacer rod 92 that may extend into a bore 102 formed in the coupler link 150. In addition, the caliper mounting bracket 90 may be secured to a steering bracket 98. A brake caliper 86 may be mounted to the caliper mounting bracket 90 and the steering bracket 98 using mechanical fasteners 194 as shown. Although FIG. 4 illustrates a disc brake system 84 including a brake rotor 88 and brake caliper 86, the motorcycle 12 may include alternative braking systems and is not limited to the disc brake system 84 illustrated in the figures.

Figure 5:
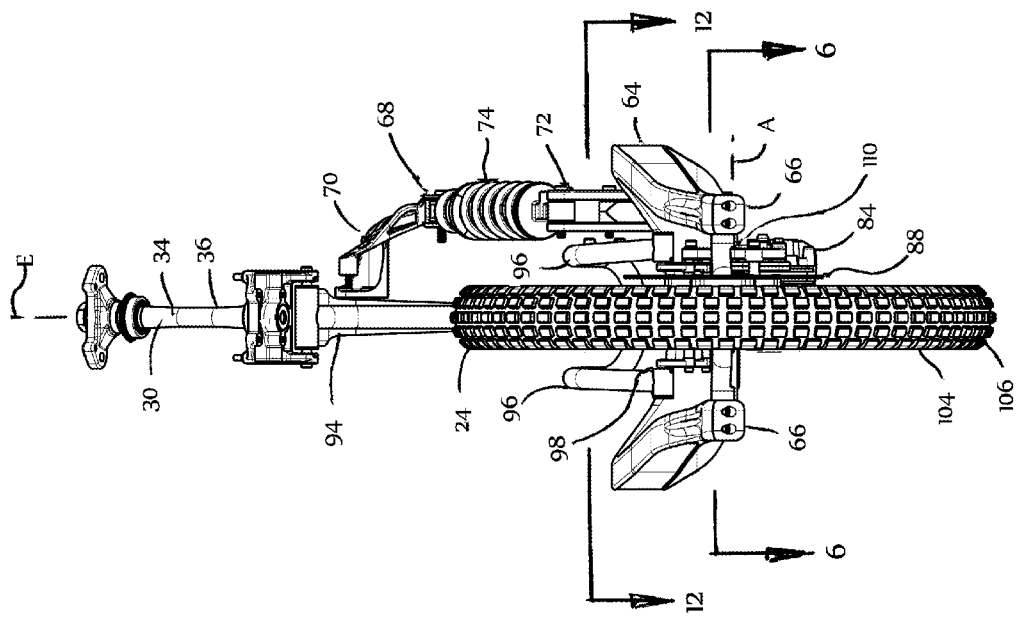
FIG. 5 is a front view of a front end of the motorcycle illustrating the front wheel supported by the swingarm and further illustrating a lower steering link coupled to a wheel hub on opposite sides of the front wheel and also illustrating a suspension system that may be coupled to the swingarm.

Referring to FIG. 5, shown is a front view of the steering mechanism 36 illustrating the front wheel 24 secured to the free ends of the swingarm 64 by means of steering brackets 98. Also shown in FIG. 5 is the lower steering link 96 extending along opposite sides of the wheel 24. The free ends of the lower steering link 96 may be secured to the steering brackets 98 by means of a universal joint and/or a ball and socket joint at each steering bracket 98. The connection of the lower steering link 96 to the steering brackets 98 is preferably such that the steering bracket 98 may freely pivot the wheel 24 through a desired steering angle H without any binding between the lower steering links 96 and the steering bracket 98.

Figure 6:
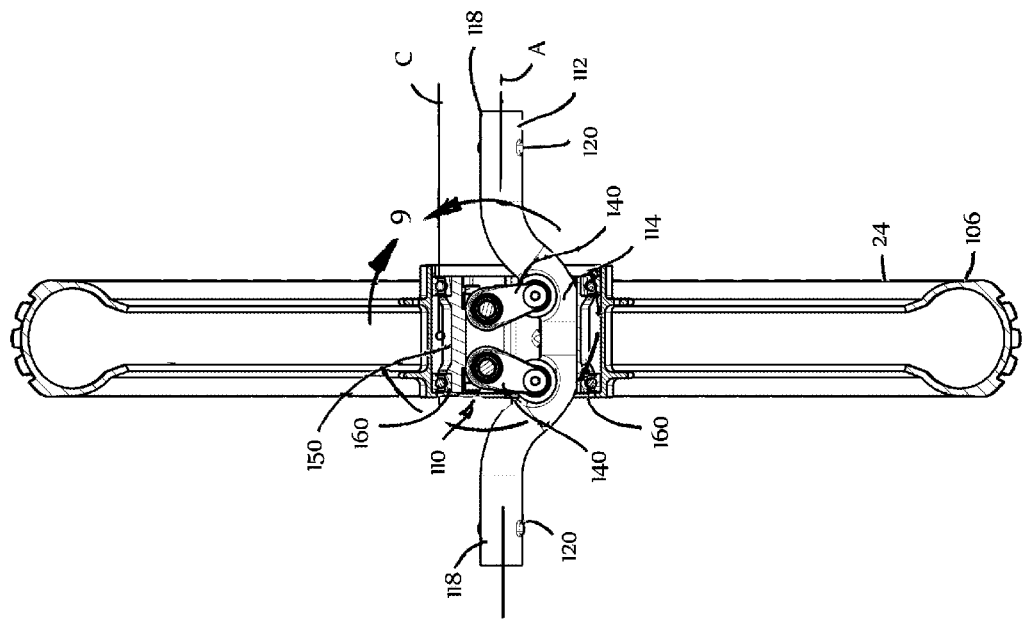
FIG. 6 is a partial sectional view taken along lines 6-6 of FIG. 5 and illustrating the four-bar linkage comprised of the ground link fixedly attached to the free ends of the swingarm and further illustrating a coupler link pivotally connected to the ground link by a pair of follower links.

Referring to FIG. 6, shown is a top sectional view of the wheel hub 192 rotatably coupled to the coupler link 150 of the four-bar linkage 110. The coupler link 150 may have a generally cylindrical outer configuration or other geometric configuration. One or more wheel bearings 160 may be mounted between the coupler link 150 and the wheel hub 192 to support the wheel 24 and provide for free rotation thereof. The four-bar linkage 110 may include the ground link 112 which may be coupled to the coupler link 150. As was indicated earlier, the ground link 112 includes opposing end portions 118 extending outwardly from the wheel hub 192 on opposite sides thereof.

One or both of the end portions 118 may include a non-rotation portion 120 for minimizing or preventing rotation of the ground link 112 relative to the swingarm 64. For example, the non-rotation portion 120 may comprise a protrusion that may be formed on an exterior surface of the end portion 118 and which may engage a corresponding indentation (not shown) that may optionally be formed in the free end of the swingarm 64 and/or within the clamps 128. Although the ground link 112 is shown having a generally joggled shape wherein the beam portion 114 is positioned forward of the end portions 118, the ground link 112 may be provided in any one of a variety of alternative embodiments. For example, the ground link 112 may be provided in a generally straight configuration.

Figure 7:
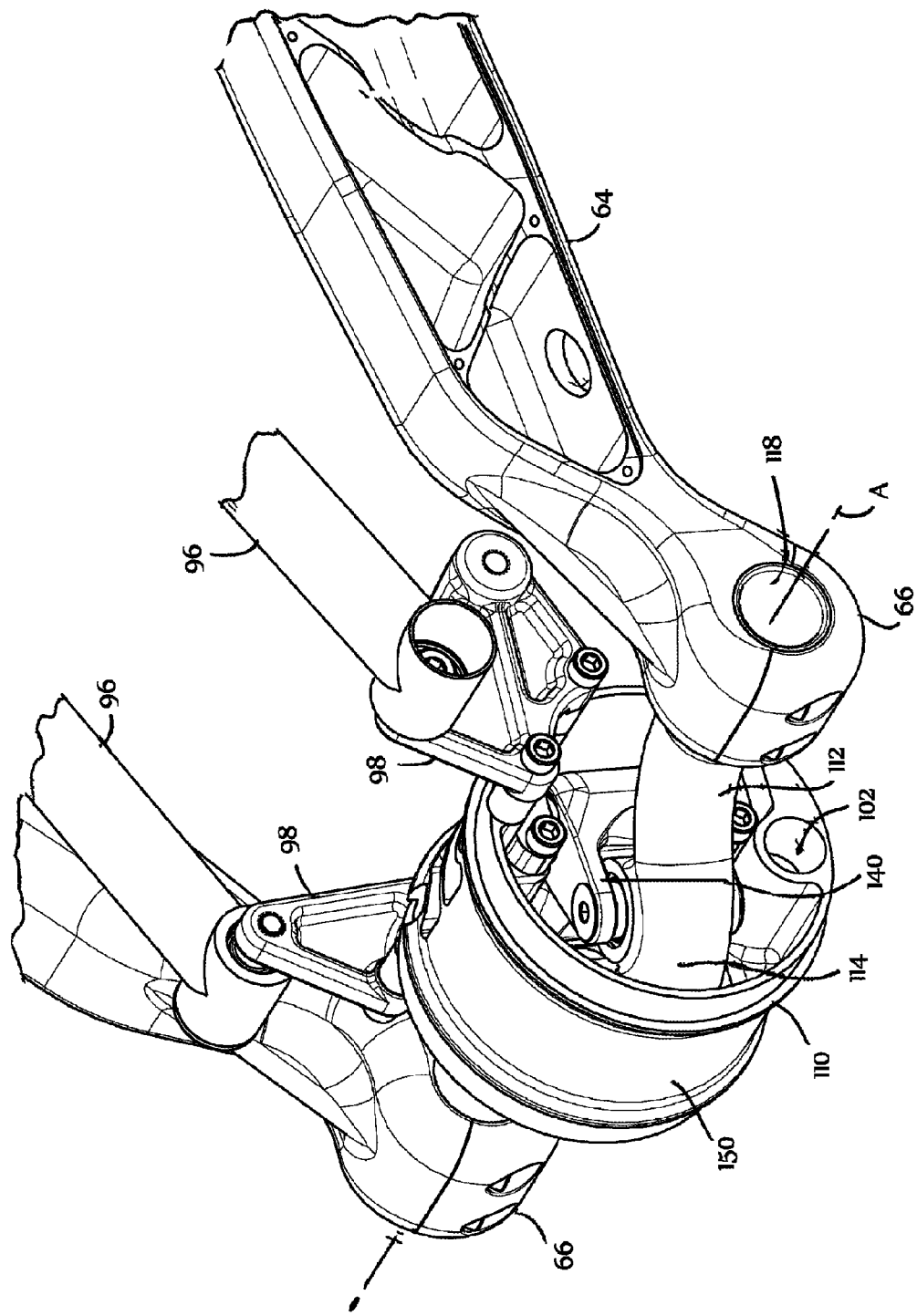
FIG. 7 is an enlarged perspective view of the wheel hub housing the four-bar linkage and further illustrating the lower steering link coupled to opposite sides of the wheel hub and also illustrating the end portions of the ground link being clamped to the free ends of the swingarm on opposite sides of the wheel hub.

Referring to FIG. 7, shown is a perspective illustration of the four-bar linkage 110 coupled to the swingarm 64 and the lower steering link 96. As indicated above, the lower steering link 96 may be coupled to each side of the coupler link 150 by means of one or more steering brackets 98. The steering brackets 98 may be mechanically fastened to the coupler link 150 and may be configured to accommodate a changing angular relation between the lower steering link 96 and the steering bracket 98 as the wheel 24 is pivoted from side to side. Also shown in FIG. 7 is the beam portion 114 of the ground link 112 housed within the generally hollow interior of the coupler link 150.

Figure 8:
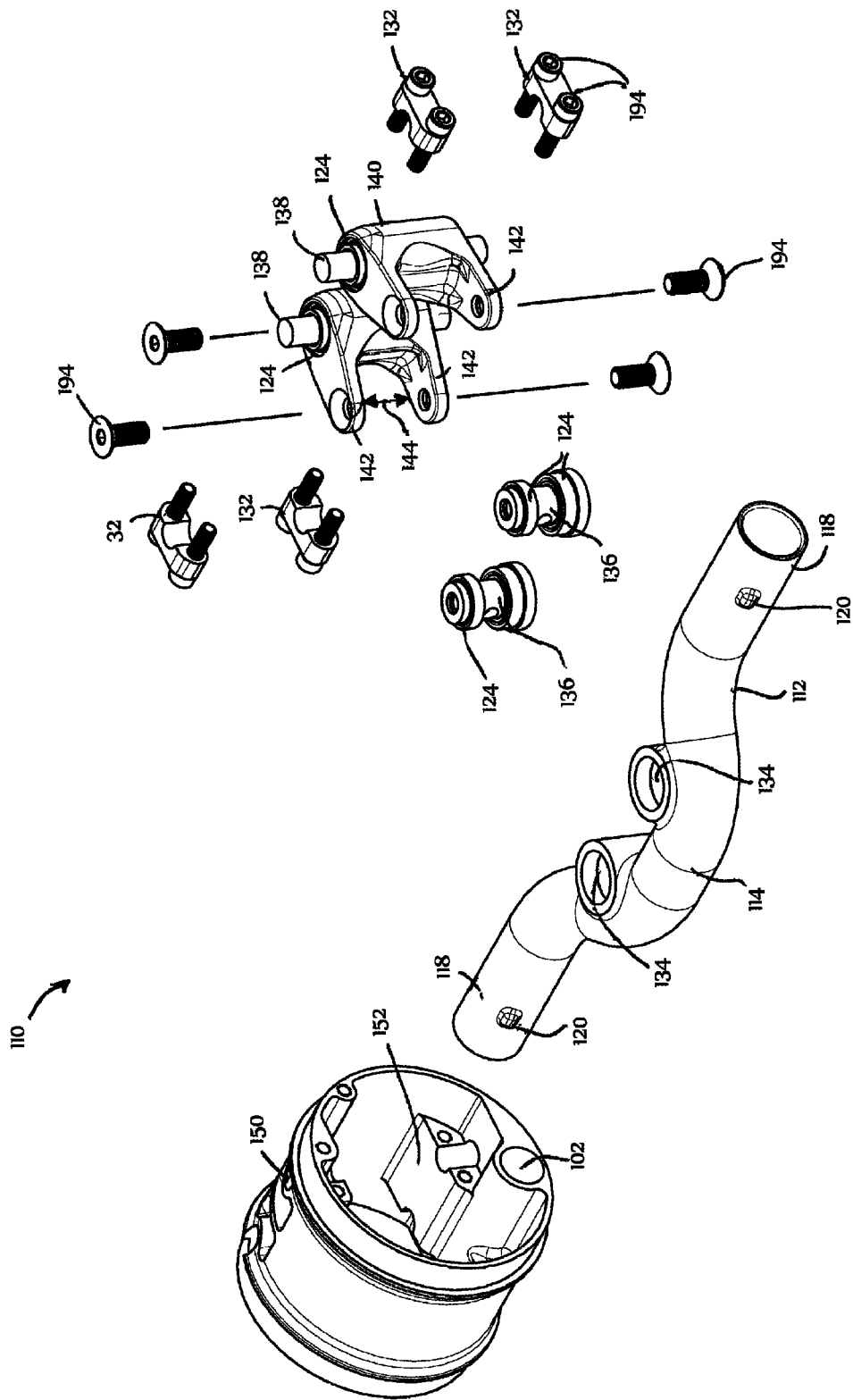
FIG. 8 is an exploded perspective view of the four-bar linkage illustrating the interconnectivity of the ground link, the follower links, and the coupler link.

Referring to FIG. 8, shown is an exploded perspective view of the four-bar linkage 110 including the coupler link 150, the ground link 112, the follower links 140, and the attaching hardware. The ground link 112 may include a pair of ground link bores 134 for connection to the follower links 140. Each one of the follower links 140 may include a solid portion 146 having upper and lower clevis portions 142 defining a clevis gap 144 therebetween. The clevis gap 144 of each follower link 140 may be sized and configured to fit over the beam portion 114 at the ground link bores 134. Each one of the follower links 140 may be coupled to the ground link 112 by means of a set of spacers 136, bearings 124, and mechanical fasteners 194. The follower links 140 may be coupled to the coupler link 150 by means of a set of follower link shafts 138, follower link spacers 136, and shaft clamps 132 that may be located on upper and lower ends of the follower link shafts 138. The solid portion 146 of each one of the follower links 140 may have a height that is sized to fit within a pad spacing 154 between upper and lower mounting pads 152 that may be formed within the coupler link 150.

Referring to FIG. 9, shown is a top sectional view of the four-bar linkage 110. The ground link 112 may include the beam portion 114 to which the follower links 140 may be coupled. In an embodiment, the ground link 112 may include internal webs for increasing the strength and stiffness of the ground link 112 to resist flexing of the ground link 112 under load. The increased strength and stiffness of the ground link 112 may reduce unwanted twisting of the wheel 24 relative to the swingarm 64. The follower links 140 are shown extending aftwardly at converging angles relative to one another. The follower links 140 may be coupled to the coupler link 150 by means of upper and lower clamps as was above indicated with regard to FIG. 8.

Figure 10:
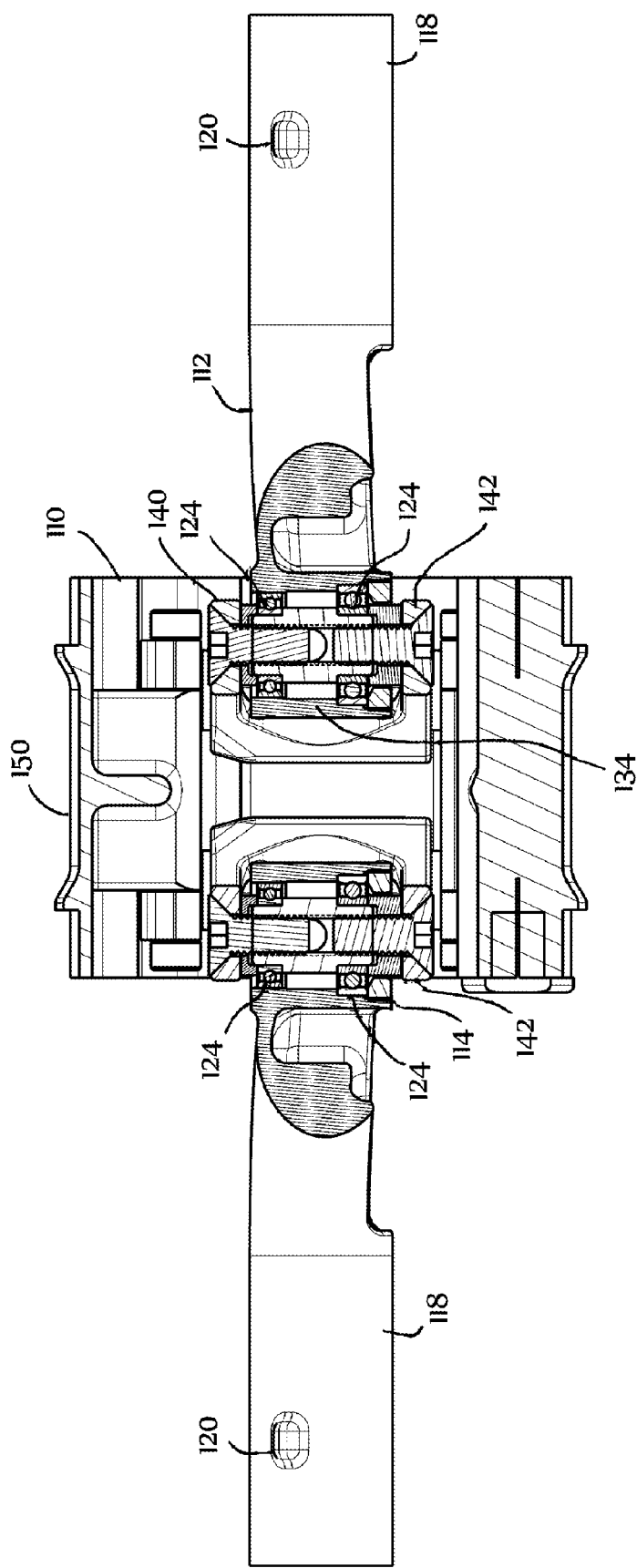
FIG. 10 is a vertical sectional view of the four-bar linkage taken along line 10 of FIG. 9 and illustrating the interconnectivity of the follower links to the ground link.

Referring to FIG. 10, shown is a vertical cross sectional view of the attachment of the follower links 140 to the ground link 112. Each one of the follower links 140 may include upper and lower clevis portions 142. The clevis portions 142 may be sized and configured to accommodate the beam portion 114 of the ground link 112. Each one of the follower links 140 may include upper and lower bearings 124 and one or more spacers 136. Mechanical fasteners 194 may be extended into threaded bores in the spacers 136 for securing the follower links 140 to the ground link 112. FIG. 10 illustrates an embodiment of the ground link 112 having non-rotation portions 120 formed on the end portions 118 to prevent rotation of the ground link 112 when clamped to the swingarm 64.

Figure 11:
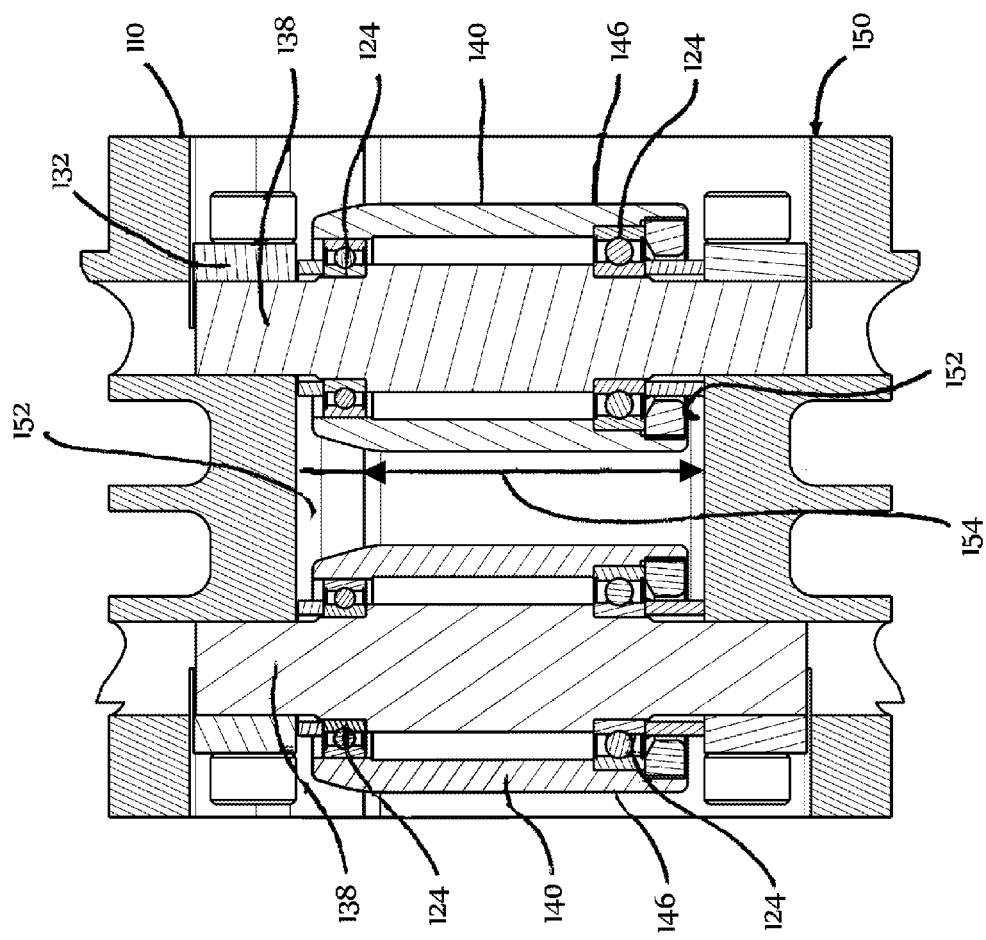
FIG. 11 is a vertical sectional view of the four-bar linkage taken along line 11 of FIG. 9 and illustrating the interconnectivity of the follower links to the coupler link.

Referring to FIG. 11, shown is a vertical cross sectional view of the attachment of the follower links 140 to the coupler link 150. Each one of a follower links 140 may include a follower link shaft 138 that may be extended through the solid portion 146 of the follower link 140. Each one of the follower links 140 may be rotatably supported by upper and lower bearings 124. Each one of the follower link shafts 138 may be coupled to the coupler link 150 by upper and lower shaft clamps 132. Mechanical fasteners 194 may secure the upper and lower shaft clamps 132 to the coupler link 150 to clamp the follower link shafts 138 in position. It should be noted that FIGS. 8-10 are representative of one embodiment for interconnecting the ground link 112, the follower links 140, and the coupler link 150, and is not to be construed as limiting alternative embodiments of the four-bar linkage 110.

Referring to FIG. 12, shown is a plan view of the front wheel 24 mounted to the swingarm 64. The swingarm 64 may be attached to the motorcycle 12 at the attach point 56 as shown in FIGS. 1-2. The front wheel 24 is secured to the swingarm 64 by means of the four-bar linkage 110 as described above. In FIG. 12, pivoting motion of the front wheel 24 may be limited by the geometry of the swingarm 64 which extends along both sides of the aftmost portion 198 of the front wheel 24. More particularly, the swingarm inner perimeter 60 limits the extent to which the aftmost portion 198 of the front wheel 24 may move laterally (e.g., side-to-side) during pivoting of the front wheel 24 through a steering angle H.

Referring to FIG. 13, shown is a schematic top view of the four-bar linkage 110 and illustrating the pivoting motion of the front wheel 24 about the steering axis C relative to the swingarm 64. Advantageously, the steering axis C is located aft of the wheel centerline A which minimizes the lateral (i.e., side-to-side) travel of the aft portion of the wheel 24 as the wheel 24 is pivoted through a given steering angle H. In this regard, the location of the steering axis C aft of the wheel centerline A allows for a reduced width of the swingarm 64 while still providing a relatively large steering angle capability for the front wheel.

Figure 14C:
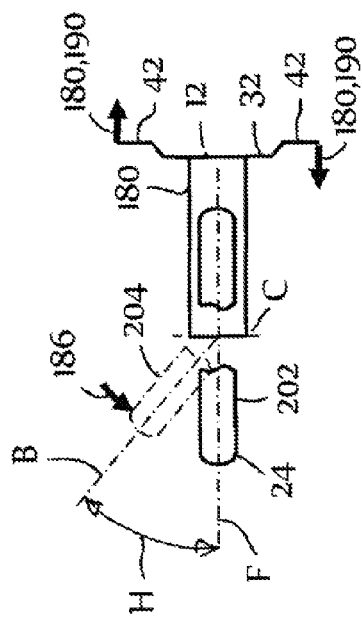
FIG. 14C is a schematic top view of the motorcycle of FIG. 14B and illustrating the steering angle and the wheel-centering force occurring at the wheel and at the handlebar grips of the motorcycle.
Figure 14B:
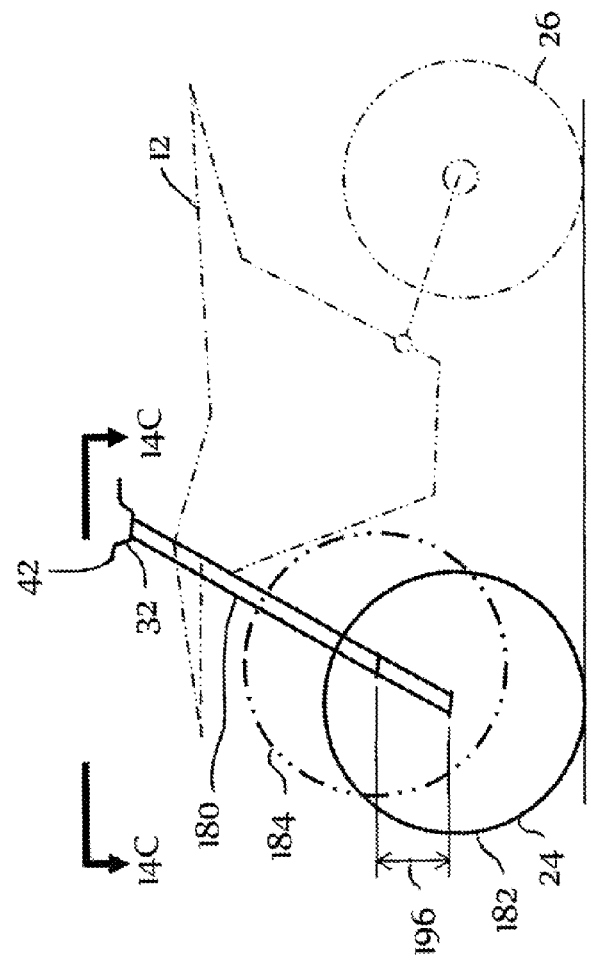
FIG. 14B is a schematic side view of a motorcycle having conventional front forks and illustrating vertical wheel displacement corresponding to full fork travel that may occur in response to the front wheel contacting a bump during forward movement of the motorcycle.

Referring to FIG. 14A-14C, shown in FIG. 14A is a table listing wheel-centering forces 186, 188 associated with different steering angles of the front wheel 24 for a motorcycle 12 having a pair of conventional telescopic front forks 180. FIG. 14B is a schematic side view of a motorcycle 12 having conventional front forks 180. As known in the art, conventional front forks 180 are typically attached to a front end of the motorcycle 12 at an upper and of the front forks 180. The handlebars 32 are typically coupled to the upper end of the front forks 180. The front wheel 24 is typically mounted to the lower end of the front forks 180. FIG. 14C is a schematic top view of the motorcycle 12 of FIG. 14B and illustrating the steering angle H and the corresponding wheel-centering force 186 at the wheel 24 and the wheel-centering force 188 at the handlebar grips 42.

Referring briefly to FIG. 14C, a rider may steer the motorcycle 12 by pushing and/or pulling on the handlebars 32 at the handlebar grips 42 to pivot the front wheel 24 through a desired steering angle H. For purposes of the present disclosure, the steering angle H is defined as the angle between the vehicle axis F (e.g., a neutral axis) and a wheel axis B of the front wheel 24 when the front wheel 24 is pivoted into a pivoted position 204 as may occur in response to a rider pushing and/or pulling on the handlebar grips 42. When the motorcycle 12 is moving forward and the front wheel 24 is pivoted into a pivoted position 204 defining a steering angle H, the geometry of the front forks 180 results in a wheel-centering force 186 that urges the front wheel 24 back toward a neutral position 202 where the wheel axis B is generally aligned with the vehicle axis F.

Conventional telescopic front forks 180 may include a suspension system for absorbing shock such as may be caused by bumps in the ground surface over which a front wheel is rolling. The front forks 180 may absorb the shock from such bumps by compressing along the length of the forks up to an amount limited by the maximum capability of fork travel which is defined herein as the full fork travel 184 of the front forks 180. As shown in FIG. 14B, during full fork travel 184, the front wheel 24 moves vertically upwardly by an amount defined as a vertical wheel displacement 196. The wheel-centering force 186 acting on the front wheel 24 and the handlebars 32 is typically larger at full fork travel 184 relative to the wheel-centering force 186 with no fork travel 182.

As shown in FIG. 14A, the wheel-centering force 186 generally increases with increasing steering angle H. For example, at a steering angle H of 2 degrees, the wheel-centering force 188 at each one of the handlebar grips 42 with no fork travel 182 is approximately 27 Newtons. In contrast, at a steering angle H of 10 degrees, the wheel-centering force 188 at each one of the handlebars 32 grip is 136 Newtons. At a steering angle H of 15 degrees, the wheel-centering force 188 at each one of the handlebars 32 grips is 209 Newtons.

Referring to FIGS. 15A-15D, shown in FIG. 15A is a table listing the wheel-centering forces 186, 188, 190 at different steering angles H for a motorcycle 12 having a four-bar linkage 110 steering mechanism 36 wherein the steering axis C is located forward of the wheel centerline A. FIG. 15B is a schematic side view of the front end of a motorcycle 12 having a four-bar linkage 110 with the steering axis C located forward of the wheel centerline A. Also shown is the vertical wheel displacement 196 of the front wheel 24 corresponding to the amount of vertical wheel displacement 196 occurring during full fork travel 184 for a motorcycle 12 having conventional telescopic front forks 180 as shown in FIGS. 14B-14C.

FIG. 15C schematically illustrates the steering angle H of the front wheel 24 which has a four-bar linkage 110 wherein the steering axis C is located forward of the wheel centerline A. Also shown is the lateral travel 200 that occurs in the aftmost portion 198 of the front wheel 24 for the maximum steering angle H. In FIG. 15C, the maximum steering angle H is limited by the geometry of the swingarm inner perimeter 60 which is defined by the swingarm width.

FIG. 15D schematically illustrates a lean angle D for the motorcycle 12 of FIG. 15B which has the steering axis C located forward of the wheel centerline A. The lean angle D of a motorcycle 12 may be defined by a line extending between the tires and an outermost hard point on a side of the motorcycle 12. In FIG. 15B, the lean angle D is defined by a line extending between the swingarm 64 and a tangent to the tire 106. The lean angle D represents the maximum angle that a motorcycle 12 may be leaned over from vertical with the hard points of the motorcycle 12 (e.g., the swingarm 64) contacting the ground surface over which the motorcycle 12 is travelling. As is known in the art, a relatively large lean angle D is generally desirable and may correspond to improved clearance with obstacles and/or improved clearance between the motorcycle 12 and the ground (e.g., pavement) during a turn. In addition, a relatively large lean angle D may correspond to a higher cornering speed for the motorcycle 12. As may be appreciated, a decrease in the swingarm width may result in an increase in the lean angle D.

Referring to FIGS. 16A-16D, shown in FIG. 16A is a table listing the wheel-centering forces 186, 188, 190 at different steering angles for a motorcycle 12 having a four-bar linkage 110 steering mechanism 36 wherein the steering axis C is located aft of the wheel centerline A as shown in FIGS. 1-13 and described herein. FIG. 16B is a schematic side view of the motorcycle 12 having the four-bar linkage 110 with the steering axis C located aft of the wheel centerline A. FIGS. 16C and 16D are schematic top and front views, respectively, of the motorcycle 12 of FIG. 16B and illustrating the increased steering angle H and reduced lateral travel 200 (FIG. 16C) of the aftmost portion 198 of the wheel 24 and further illustrating the increased lean angle D (FIG. 16D) of the motorcycle 12 due to the four-bar linkage 110 which advantageously locates the steering axis C aft of the wheel centerline A.

As shown in FIG. 16C, the location of the steering axis C aft of the wheel centerline A advantageously results in a minimized amount of lateral travel 200 of the aftmost portion 198 of the wheel 24 for a given steering angle H. The minimized amount of lateral travel 200 of the aftmost portion 198 of the wheel 24 results in a swingarm 64 having a reduced swingarm width (FIG. 16C) relative to the swingarm width required for the four-bar linkage 110 arrangement of FIG. 15C wherein the steering axis C is located forward of the wheel centerline A. In FIG. 16C, the advantage provided by locating the steering axis C aft of the wheel centerline A may also be stated as an increase in the steering angle H of the front wheel 24 for the same swingarm width of the four-bar linkage 110 in FIG. 15C wherein the steering axis C is located forward of the wheel centerline A. In FIG. 16D, the reduced swingarm width may correspond to an increase in the lean angle D for the motorcycle 12 relative to the smaller lean angle D (FIG. 15D) provided by a motorcycle 12 having a four-bar linkage 110 with the steering axis C located forward of the wheel centerline A. As indicated above, the increased lean angle D may correspond to improved clearance with obstacles and/or improved clearance between the motorcycle 12 and the ground (e.g., pavement) during a turn which may correspond to a higher cornering speed for the motorcycle 12

Referring to FIGS. 15A and 16A, it can also be seen that the wheel-centering forces 186, 188, 190 for the reverse four-bar linkage 110 having the steering axis C located aft of the wheel centerline A (FIGS. 1-13 and 16B-16D) are advantageously lower than the wheel-centering forces 186, 188, 190 for the original four-bar linkage having the steering axis C located forward of the wheel centerline A (FIGS. 15A-15B). For example, in FIG. 15A, for a steering angle H of 10 degrees, the wheel-centering force 188 at the handlebar grips 42 is approximately 246 Newtons. In contrast, in FIG. 16A, for a steering angle H of 10 degrees, the wheel-centering force 188 at the handlebar grips 42 is approximately 125 Newtons, or almost half the wheel-centering force 188 listed in FIG. 15A. Advantageously, a reduced wheel-centering force 188 at the handlebar grips 42 corresponds to less force input required by the rider to maintain the front wheel 24 at a desired steering angle. It should be noted that although FIG. 16A indicates a steering angle H of up to 15 degrees, the steering mechanism 36 as disclosed herein may be configured to allow for pivoting of the wheel 24 at a steering angle H larger than 15 degrees such as a steering angle H of at least approximately 35 degrees or more.

Referring briefly to FIGS. 14A and 16A, it can also be seen that the wheel-centering forces 186, 188, 190 for the reverse four-bar linkage 110 (FIGS. 1-13 and 16B-16D) advantageously correspond to the wheel-centering forces 186, 188 of a conventional telescopic front fork 180 arrangement. For example, in FIG. 14A, for a steering angle H of 10 degrees, the wheel-centering force 188 at the handlebar grips 42 is approximately 136 Newtons which closely corresponds to a wheel-centering force 188 at the handlebar grips 42 of approximately 125 Newtons for FIG. 16A. Advantageously, by duplicating the wheel-centering forces 186, 188 of a conventional telescopic front fork 180, a rider may more rapidly and safely adjust to the steering inputs required for a motorcycle 12 having a reverse four-bar linkage 110 as disclosed herein.

The above description is given by way of example, and not limitation. Given the above disclosure, one skilled in the art could devise variations that are within the scope and spirit of the disclosure provided herein, including various ways of interconnecting the ground link 112 to the coupler link 150 via the follower links 140. In addition one skilled in the art could devise variations in connecting the coupler link 150 to the front wheel 24, variations in the configuration and mounting arrangement of the swingarm 64, variations in the configuration and mounting of the steering drive 30 include the upper and lower steering link 94, 96 and in connecting the upper and lower steering link 94, 96 to the coupler link 150, variations in the suspension system 68 and attachments thereof to the motorcycle 12, and other variations that are within the spirit and scope of the present disclosure. Furthermore, the various features of the embodiments disclosed herein can be used alone, or in varying combinations with each other, and are not intended to be limited to the specific combination described herein. Thus, the scope of the claims is not to be limited by the illustrated embodiments.

What is claimed is:

1. A steering mechanism, comprising:
  a four-bar linkage, including:
    a ground link connected to a vehicle having a wheel defining a wheel centerline;
    a coupler link connected to the wheel and being located aft of the ground link;
    a pair of converging follower links pivotally connecting the ground link to the coupler link; and
    the converging follower links extending aftwardly from the ground link at converging angles wherein the spacing between the attachment points of the converging follower links to the ground link is wider than the spacing between the attachment points of the converging follower links to the coupler link and;
    the converging follower links defining a steering axis located aft of the wheel centerline.

2. The steering mechanism of claim 1 wherein the vehicle includes a steering drive coupled to the coupler link and being configured to impart lateral movement to the coupler link for steering the vehicle.

3. The steering mechanism of claim 1 wherein the four-bar linkage is mounted to a front wheel of the vehicle.

4. The steering mechanism of claim 1 wherein the four-bar linkage is configured to allow the wheel to be pivotable through a steering angle of at least approximately 35 degrees.

5. The steering mechanism of claim 1 wherein the wheel has a wheel hub and the four-bar linkage is sized and configured to be housed within the wheel hub.

6. The steering mechanism of claim 5 wherein the coupler link has a hollow cylindrical configuration and being mounted within and rotatably supporting the wheel hub.

7. The steering mechanism of claim 1 wherein the four-bar linkage is mounted on a swingarm pivotably coupled to the vehicle.

8. The steering mechanism of claim 7 wherein the swingarm is coupled to a suspension system configured to support vertical deflection of the wheel.

9. The steering mechanism of claim 7 wherein the ground link is non-rotatably mounted to the swingarm.

10. The steering mechanism of claim 7 wherein the vehicle is a motorcycle and the swingarm extends forwardly from the motorcycle.

11. The steering mechanism of claim 10 wherein the motorcycle includes handlebars interconnected to the four-bar linkage for steering input to the coupler link.

12. A motorcycle, comprising:
a four-bar linkage, including:
a ground link connected to a motorcycle defining a vehicle axis and having a front wheel and a rear wheel each having a wheel centerline oriented perpendicular to the vehicle axis;
a coupler link connected to a wheel hub of the wheel and being located aft of the ground link;
a pair of converging follower links pivotally connecting the ground link to the coupler link; and
the converging follower links extending aftwardly from the ground link at converging angles wherein the spacing between the attachment points of the converging follower links to the around link is wider than the spacing between the attachment points of the converging follower links (to the coupler link and;
the converging follower links defining a steering axis located aft of the wheel centerline.

13. The motorcycle of claim 12 further comprising handlebars interconnected to the coupler link and being configured to impart lateral movement to the coupler link for steering the motorcycle.

14. The motorcycle of claim 12 wherein the four-bar linkage is housed within the wheel hub.

15. The motorcycle of claim 12 wherein the coupler link has a hollow cylindrical configuration configured to rotatably supporting the wheel hub.

16. The motorcycle of claim 12 wherein the four-bar linkage is configured to allow the wheel to be pivotable through a steering angle of at least approximately 35 degrees.

17. The motorcycle of claim 12 further comprising a forwardly extending swingarm having the ground link non-rotatably attached to a free end of the swingarm.

18. The motorcycle of claim 17 wherein the swingarm is pivotally attached to the motorcycle and including a suspension system operative to allow for vertical deflection of the wheel.

19. The motorcycle of claim 17 wherein the swingarm extends forwardly from the motorcycle along at least one of opposing sides of the front wheel.

* * * * *